US010684469B2

(12) United States Patent
Smith et al.

(10) Patent No.: US 10,684,469 B2
(45) Date of Patent: Jun. 16, 2020

(54) DETECTING AND MITIGATING MOTION SICKNESS IN AUGMENTED AND VIRTUAL REALITY SYSTEMS

(71) Applicant: Dell Products L.P., Round Rock, TX (US)

(72) Inventors: Hana Schuster Smith, Boulder, CO (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/168,361

(22) Filed: Oct. 23, 2018

(65) Prior Publication Data

US 2020/0124845 A1    Apr. 23, 2020

(51) Int. Cl.
*G06F 3/13* (2006.01)
*G02B 27/00* (2006.01)
*G06F 3/01* (2006.01)
*G02B 27/01* (2006.01)

(52) U.S. Cl.
CPC ....... *G02B 27/0093* (2013.01); *G02B 27/017* (2013.01); *G06F 3/013* (2013.01); *G02B 2027/0123* (2013.01); *G02B 2027/0129* (2013.01); *G02B 2027/0147* (2013.01)

(58) Field of Classification Search
CPC .............. G02B 27/0093; G02B 27/017; G02B 2027/0123; G02B 2027/0129; G02B 2027/0147; G06F 3/013
See application file for complete search history.

(56) References Cited

U.S. PATENT DOCUMENTS

2016/0228771 A1*    8/2016  Watson ................. G06F 3/013

OTHER PUBLICATIONS

Bonato, Frederick, et al. "Combined pitch and roll and cybersickness in a virtual environment." *Aviation, space, and environmental medicine* 80.11 (2009): 941-945; 5 pages, 2009.
Joseph, Judith A., et al. "Motion sickness: Effect of the magnitude of roll and pitch oscillation." *Aviation, space, and environmental medicine* 79.4 (2008): 390-396; 7 pages, 2008.

(Continued)

*Primary Examiner* — Lisa S Landis
(74) *Attorney, Agent, or Firm* — Baker Botts L.L.P.

(57) ABSTRACT

Methods for detecting and mitigating conditions associated with motion sickness and visual fatigue for users of augmented or virtual reality systems include receiving, during operation of a head-mounted display device, sensor data from inertial measurement unit sensors of the device, determining, dependent on the sensor data, that a condition associated with motion sickness or visual fatigue exists, and modifying, in response to determining that the condition exists, an operating parameter for the device to mitigate the detected condition. The sensor data may include acceleration data with respect to six degrees of freedom. Detecting a condition associated with motion sickness or visual fatigue may include comparing change rates for the sensor data to predetermined gradient thresholds. Modifying an operating parameter may include changing a rendering resolution, a spatial quality setting, or an effective field of view to, at least partially, mitigate the detected condition. The method may be repeated periodically.

17 Claims, 13 Drawing Sheets

(56) References Cited

OTHER PUBLICATIONS

"Inertial Measurement Unit." *Wikipedia*, Wikimedia Foundation, Oct. 20, 2018, en.wikipedia.org/wiki/Inertial_measurement_unit; 3 pages, Oct. 20, 2018.
Terndrup, Matthew. "Hands-on with DAQRI's New Industrial Augmented Reality Helmet—Road to VR," *Road to VR*, Feb. 27, 2015, www.roadtovr.com/hands-daqris-new-industrial-augmented-reality-helmet/; 8 pages, Feb. 27, 2015.
"Six degrees of freedom." *Wikipedia*, Wikimedia Foundation, Jun. 10, 2018, en.wikipedia.org/wiki/Six_degrees_of_freedom; 4 pages, Jun. 10, 2018.
Husna, Asma Ul, et al. "Fatigue Estimation through Face Monitoring and Eye Blinking." *International Conference on Mechanical, Industrial and Energy Engineering*. 2014; 5 pages, 2014.
Diels, Cyriel, et al. "Visually induced motion sickness during single and dual axis motion." *Proceedings of the First International Symposium on Visually Induced Motion Sickness, Fatigue, and Photosensitive Epileptic Seizures (VIMS2007)*. 2007; 9 pages, 2007.
Nooij, Suzanne AE, et al. "Vection is the main contributor to motion sickness induced by visual yaw rotation: Implications for conflict and eye movement theories." *PloS one* 12.4 (2017); 19 pages, 2017.
"What Is the Meaning of IMU or Inertial Measurement Unit?" *All Virtual Reality*, allvirtualreality.com/tutorials/what-meaning-imu-inertial-measurement-unit.html, Sep. 26, 2014; 5 pages, Sep. 26, 2014.

\* cited by examiner

DETECTING AND MITIGATING MOTION SICKNESS IN AUGMENTED AND VIRTUAL REALITY SYSTEMS

BACKGROUND

Field of the Disclosure

This disclosure relates generally to information handling systems and, more particularly, to systems and methods for detecting and mitigating motion sickness in augmented and virtual reality systems that include head-mounted displays.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems may be or include display devices, head-mounted display devices, head-mount display systems, desktop computers, server systems, microprocessors, controllers, microcontroller units, and/or combinations thereof. Some information handling systems are configured to implement a virtual reality (VR) system, an augmented reality (AR) system, or a mixed reality (MR) system. A head-mounted device (HMD) is a physical apparatus mounted to a user's head, such as a VR headset, an AR headset, night vision goggles, and so forth. In a virtual reality system, a user is immersed in digitally-generated surroundings via a head-mounted device. The goal is complete immersion, so in an ideal solution the user's physical surroundings are completely obscured to the surroundings. In both augmented reality and mixed reality systems, the systems impose digital entities upon a user's real-world physical environment. In the case of a pure augmented reality system, these digital entities may simply behave like a heads-up display (HUD) with no perceived interaction with the physical surrounding. In the case of a mixed reality system, the system may exhibit an awareness of the user's immediate environment and cause the digital entities to interact with it, such as, for example, allowing the user to place a holographic object on a real table.

SUMMARY

In one aspect, a disclosed information handling system includes an interface through which a head-mounted display is communicatively coupled to the information handling system, a processor, and non-transitory computer readable memory media storing instructions. The instructions are executable by the processor for receiving, during operation of the head-mounted display device, sensor data from one or more inertial measurement unit sensors of the head-mounted display device, determining, dependent on the sensor data, whether a condition associated with motion sickness or visual fatigue exists, and modifying, in response to determining that a condition associated with motion sickness or visual fatigue exists, an operating parameter for the head-mounted display device to mitigate the detected condition.

In any of the disclosed embodiments, the sensor data may include data indicating respective acceleration values for the head-mounted display device with respect to each of a plurality of degrees of freedom, and determining whether a condition associated with motion sickness or visual fatigue exists may include, for sensor data indicating acceleration values for the head-mounted display device with respect to a given degree of freedom, computing a hysteresis-based average of a plurality of the acceleration values, computing a gradient value associated with the given degree of freedom dependent on the computed hysteresis-based average of the plurality of the acceleration values and a previously computed hysteresis-based average of acceleration values with respect to the given degree of freedom, and determining whether the computed gradient value associated with the given degree of freedom meets or exceeds a predetermined gradient threshold value for the head-mounted display device with respect to the given degree of freedom.

In any of the disclosed embodiments, the instructions may be further executable by the processor for determining the gradient threshold value through a calibration exercise associated with the head-mounted display device.

In any of the disclosed embodiments, the instructions may be further executable by the processor for repeating, at predetermined intervals dependent on a frequency at which the sensor data is received, determining whether a condition associated with motion sickness or visual fatigue exists.

In any of the disclosed embodiments, the instructions may be further executable by the processor for receiving eye gaze tracking data from one or more eye tracking sensors of the head-mounted display device, and determining whether a condition associated with motion sickness or visual fatigue exists may be further dependent on the eye gaze tracking data.

In any of the disclosed embodiments, the instructions may be further executable by the processor for, in response to determining that a condition associated with motion sickness or visual fatigue does not exist, obtaining one or more of a rendering resolution for rendering frames to be displayed on the head-mounted display device and a spatial quality setting for frames to be displayed on the head-mounted display device, and determining whether at least one of the rendering resolution and the spatial quality setting is less than a respective predetermined maximum value for the rendering resolution or the spatial quality setting. Modifying an operating parameter for the head-mounted display device may include increasing the rendering resolution or the spatial quality in response to determining that at least one of the rendering resolution and the spatial quality setting is less than the respective predetermined maximum value.

In any of the disclosed embodiments, the instructions may be further executable by the processor for obtaining timing data associated with frames rendered for display on the head-mounted display device, calculating, dependent on the timing data, frame rates for the head-mounted display device in terms of frames per second, applying a hysteresis-based averaging of the frame rates, and determining that the hysteresis-based average of the frame rates is less than a predetermined target frame rate. Modifying an operating parameter for the head-mounted display device may include reducing one or more of a rendering resolution for rendering frames to be displayed on the head-mounted display device, an effective field of view of the head-mounted display device, and a spatial quality setting for frames to be displayed on the head-mounted display device.

In any of the disclosed embodiments, the instructions may be further executable by the processor for obtaining timing data associated with frames rendered for display on the head-mounted display device, obtaining simultaneous localization and mapping data from the head-mounted display device, computing, based on the timing data and the simultaneous localization and mapping data, a motion parallax velocity, and determining that the motion parallax velocity indicates motion parallax. Modifying the operating parameter for the head-mounted display device may include increasing an effective field of view of the head-mounted display device by an amount dependent on the motion parallax velocity.

In another aspect, a disclosed method is for detecting and mitigating motion sickness or visual fatigue for a user wearing a head-mounted display device. The method includes receiving, during operation of a head-mounted display device, sensor data from one or more inertial measurement unit sensors of the head-mounted display device, determining, dependent on the sensor data, that a condition associated with motion sickness or visual fatigue exists, and modifying, in response to determining that a condition associated with motion sickness or visual fatigue exists, an operating parameter for the head-mounted display device to mitigate the detected condition.

In any of the disclosed embodiments, the sensor data may include data indicating respective acceleration values for the head-mounted display device with respect to each of a plurality of degrees of freedom. Determining that a condition associated with motion sickness or visual fatigue exists may include, for sensor data indicating acceleration values for the head-mounted display device with respect to a given degree of freedom, computing a hysteresis-based average of a plurality of the acceleration values, computing a gradient value associated with the given degree of freedom dependent on the computed hysteresis-based average of the plurality of the acceleration values and a previously computed hysteresis-based average of acceleration values with respect to the given degree of freedom, and determining that the computed gradient value associated with the given degree of freedom meets or exceeds a predetermined gradient threshold value for the head-mounted display device with respect to the given degree of freedom.

In any of the disclosed embodiments, the method may further include determining the gradient threshold value through a calibration exercise associated with the head-mounted display device.

In any of the disclosed embodiments, the method may further include receiving eye gaze tracking data from one or more eye tracking sensors of the head-mounted display device, and determining that a condition associated with motion sickness or visual fatigue exists may be further dependent on the eye gaze tracking data.

In any of the disclosed embodiments, the method may further include obtaining timing data associated with frames rendered for display on the head-mounted display device, calculating, dependent on the timing data, frame rates for the head-mounted display device in terms of frames per second, applying a hysteresis-based averaging of the frame rates, and determining that the hysteresis-based average of the frame rates is less than a predetermined target frame rate. Modifying an operating parameter for the head-mounted display device may include reducing one or more of a rendering resolution for rendering frames to be displayed on the head-mounted display device, an effective field of view of the head-mounted display device, and a spatial quality setting for frames to be displayed on the head-mounted display device.

In any of the disclosed embodiments, the method may further include obtaining timing data associated with frames rendered for display on the head-mounted display device, obtaining simultaneous localization and mapping data from the head-mounted display device, computing, based on the timing data and the simultaneous localization and mapping data, a motion parallax velocity, and determining that the motion parallax velocity indicates motion parallax. Modifying the operating parameter for the head-mounted display device may include increasing an effective field of view of the head-mounted display device by an amount dependent on the motion parallax velocity.

In yet another aspect, a disclosed non-transitory computer readable memory media stores instructions executable by a processor for receiving, during operation of a head-mounted display device, sensor data from one or more inertial measurement unit sensors of the head-mounted display device, determining, dependent on the sensor data, whether a condition associated with motion sickness or visual fatigue exists, and modifying, in response to determining that a condition associated with motion sickness or visual fatigue exists, an operating parameter for the head-mounted display device to mitigate the detected condition.

In any of the disclosed embodiments, the sensor data may include data indicating respective acceleration values for the head-mounted display device with respect to each of a plurality of degrees of freedom. Determining whether a condition associated with motion sickness or visual fatigue exists may include, for sensor data indicating acceleration values for the head-mounted display device with respect to a given degree of freedom, computing a hysteresis-based average of a plurality of the acceleration values, computing a gradient value associated with the given degree of freedom dependent on the computed hysteresis-based average of the plurality of the acceleration values and a previously computed hysteresis-based average of acceleration values with respect to the given degree of freedom, and determining whether the computed gradient value associated with the given degree of freedom meets or exceeds a predetermined gradient threshold value for the head-mounted display device with respect to the given degree of freedom.

In any of the disclosed embodiments, the instructions may be further executable by the processor for receiving eye gaze tracking data from one or more eye tracking sensors of the head-mounted display device, and determining whether a condition associated with motion sickness or visual fatigue exists may be further dependent on the eye gaze tracking data.

In any of the disclosed embodiments, the instructions may be further executable by the processor for, in response to determining that a condition associated with motion sickness or visual fatigue does not exist, obtaining one or more of a rendering resolution for rendering frames to be displayed on the head-mounted display device and a spatial quality setting for frames to be displayed on the head-mounted display device, and determining whether at least one of the rendering resolution and the spatial quality setting is less than a respective predetermined maximum value for the rendering resolution or the spatial quality setting. Modifying an operating parameter for the head-mounted display device may include increasing the rendering resolution or the spatial quality in response to determining that at least one of the rendering resolution and the spatial quality setting is less than the respective predetermined maximum value.

In any of the disclosed embodiments, the instructions may be further executable by the processor for obtaining timing data associated with frames rendered for display on the head-mounted display device, calculating, dependent on the timing data, frame rates for the head-mounted display device in terms of frames per second, applying a hysteresis-based averaging of the frame rates, and determining that the hysteresis-based average of the frame rates is less than a predetermined target frame rate. Modifying an operating parameter for the head-mounted display device may include reducing one or more of a rendering resolution for rendering frames to be displayed on the head-mounted display device, an effective field of view of the head-mounted display device, and a spatial quality setting for frames to be displayed on the head-mounted display device.

In any of the disclosed embodiments, the instructions may be further executable by the processor for obtaining timing data associated with frames rendered for display on the head-mounted display device, obtaining simultaneous localization and mapping data from the head-mounted display device, computing, based on the timing data and the simultaneous localization and mapping data, a motion parallax velocity, and determining that the motion parallax velocity indicates motion parallax. Modifying the operating parameter for the head-mounted display device may include increasing an effective field of view of the head-mounted display device by an amount dependent on the motion parallax velocity.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
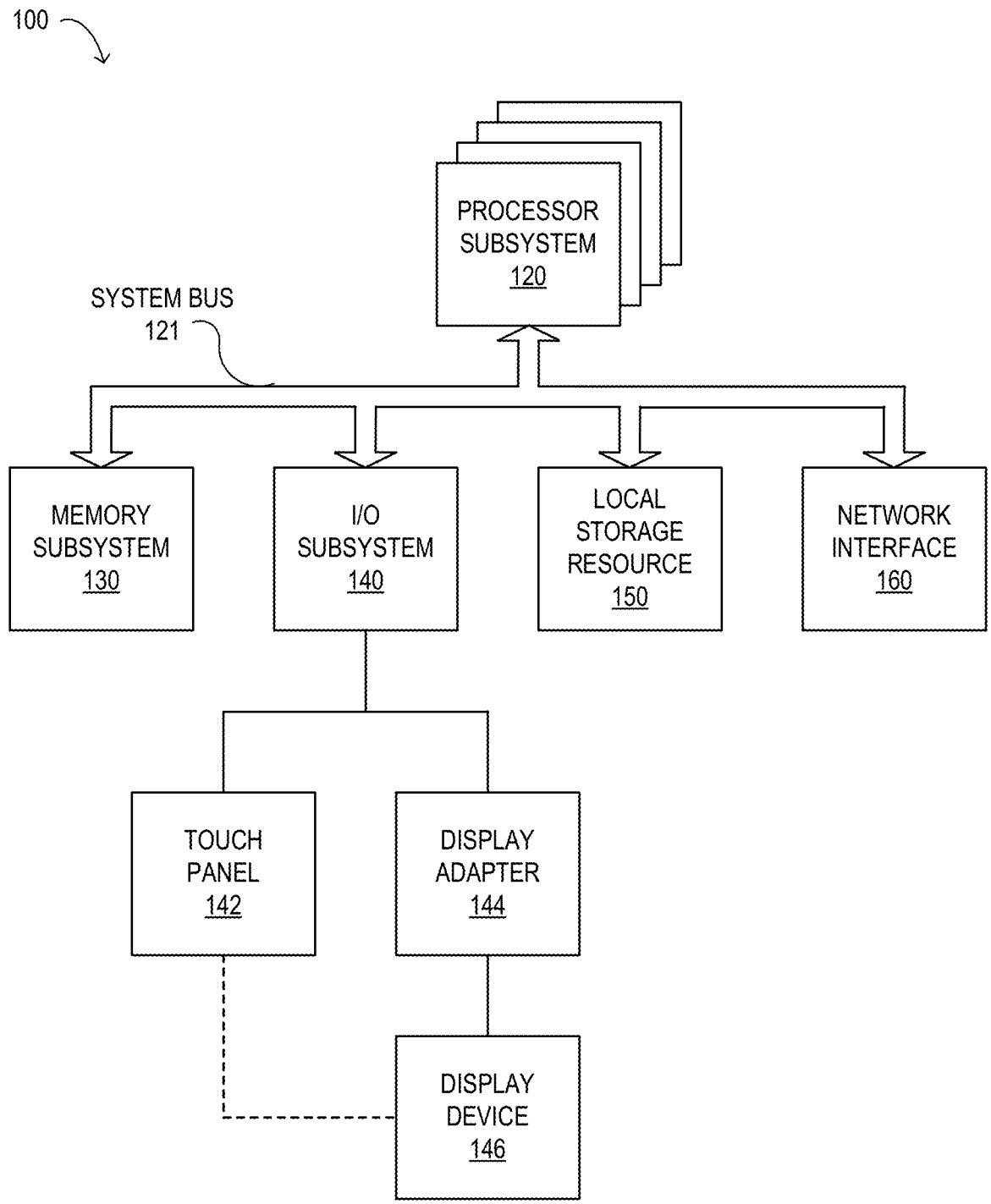
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-11C wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head-mounted displays, head-mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network. Network interface 160 may enable information handling system 100 to communicate over the network using a suitable transmission protocol and/or standard, including, but not limited to, transmission protocols and/or standards enumerated below with respect to the discussion of the network. In some embodiments, network interface 160 may be communicatively coupled via the network to a network storage resource. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in a network storage resource, not shown).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. As shown, I/O subsystem 140 may comprise touch panel 142 and display adapter 144. In some embodiments, touch panel 142 may include circuitry for enabling touch functionality in conjunction with a display device 146 that is driven by display adapter 144, such as a monitor or display panel. In other embodiments, display device 146 may be a head-mounted display device Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In addition to local storage resources 150, in some embodiments, information handling system 100 may communicatively couple via network 165 to a network storage resource (not shown) using network interface 160 discussed below.

Network interface 160 may be a suitable system, apparatus, or device operable to serve as an interface between information handling system 100 and network 165. Network interface 160 may enable information handling system 100 to communicate over a network using any suitable transmission protocol and/or standard, including, but not limited to various transmission protocols and/or standards. The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data or information). In some embodiments, the network communicatively coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network, network interface 160, and/or various components associated therewith may be implemented using hardware, software, or any combination thereof. Network interface 160 may enable wired and/or wireless communications to and/or from information handling system 100.

As noted above, an information handling system may include, or be communicably coupled to, a head-mounted display device. For example, in some embodiments, an information handling system, such as a desktop or laptop computer, may serve as a host system for a head-mounted display device that is tethered to the information handling system by a wired or wireless connection. A head-mounted display device may comprise a head-mounted virtual reality display, a head-mounted augmented reality display, a head-mounted mixed reality display, or another type of head-mounted display. A typical head-mounted display device may include a display unit and straps coupled to the display unit to allow the head-mounted display device to be worn by a user. A user may wear the head-mounted display device by placing the device on their head with a visor portion of the head-mounted display device positioned in front of their face and looking straight toward a display of the visor portion. When a user is wearing a head-mounted display device, the user views an image represented by a right eye image with the user's right eye, and views the same image represented by a left eye image with the user's left eye. The user's eyes merge the right eye image and the left eye image into a combined image. In some embodiments, a head-mounted display-device may implement eye gaze tracking (EGT), which is the process of electronically locating the point of a person's gaze or following and recording the movement of the point of gaze. Various technologies exist for accomplishing this task; some methods involve attachments to the eye, while others rely on images of the eye taken without any physical contact.

Virtual reality, augmented reality, and mixed reality head-mounted display devices are beginning to find widespread use in various industries as well as for consumer gaming use cases. A commonly reported problem with head-mounted display devices is induced motion sickness due to the use of these devices for extended periods of time, the use of these devices with "stressful content," or simply the user's inability to tolerate a certain degree of movement (e.g., movement with respect to six degrees of freedom: fore-aft (x-axis), lateral (y-axis), vertical (z-axis), yaw, pitch, and roll) without experiencing a feeling of motion sickness. For example, yaw based visually induced motion sickness (VIMS) can lead to multiple symptoms including dizziness and lack of orientation. Similarly, sudden and/or oscillatory changes in pitch and roll (independently or combined) can lead to motion sickness in a head-mounted display device wearer. Also, sudden and/or oscillatory changes in fore-aft (x-axis), lateral (y-axis), vertical (z-axis) movement can lead to motion sickness.

A variety of factors can contribute to a feeling of motion sickness. In some cases, receiving incongruent feedback from a user's ears (in which the cochlea in the ears do not indicate movement) and a user's eyes (which indicate movement), or vice versa, may cause motion sickness symptoms in the user. For example, in a virtual reality system in which the user is shown images as if the user is walking on a treadmill, but the user is not actually walking, the incongruent feedback received from the user's eyes and ears may induce motion sickness. As described in more detail below, in some cases, this effect may be amplified based on the user's effective field of view (FOV).

Other factors that may contribute to a feeling of motion sickness for a user of a virtual reality, augmented reality, or mixed reality head-mounted display device may include rendering issues, such as a poor refresh rate for the images displayed by the device. In some cases, if processing resources of a host system need to be dedicated to other things, this may hinder the refresh rate. Another often reported problem with virtual reality, augmented reality, and mixed reality head-mounted display devices is visual strain followed by visual fatigue due to, for example, long user sessions, stressful or intense content, being focused on something very close to the eyes (e.g., a virtual reality head-mounted display device screen) that displays content perceptually far away or, in some cases, simply a user's low visual tolerance.

For gaming and other highly interactive applications of augmented or virtual reality technology in which a user is standing or is grounded for the most part and is using a hand-held controller, for example, rapid movements in various ones of the six degrees of freedom, especially pitch, yaw and roll, may be commonplace. These movements may be induced either by the user's actions or by the displayed content, and not every user will be comfortable with particular kinds of highly interactive content. For use cases that involve the user interacting in a simulator while wearing an augmented or virtual reality head-mounted display device, such as in a flight simulator, sudden and/or oscillatory movements in the x-axis, y-axis, and/or z-axis that can cause motion sickness may come into play.

In existing augmented or virtual reality systems including head-mounted display devices, the typical approach to mitigating motion sickness or visual fatigue is for the user to take off the head-mounted display device or to limit the amount of time that the head-mounted display device is used in each augmented or virtual reality session. Some systems may display periodic reminders for the user to take a break. However, this approach can negatively affect productivity when the augmented or virtual reality system is being used in a professional setting, such as in a design or manufacturing setting or in a communication setting (e.g., when the system is providing instructions or giving directions), or a collaborative setting, such as when playing a collaborative multi-player game. In these and other settings, it may be desirable for the users to be able to keep their head-mounted display devices on and to be able to leave them on for prolonged periods of time. Therefore, it may be desirable, from a safety and overall ergonomic perspective, to be able to detect early signs of visual fatigue and/or motion sickness in the head-mounted display device wearer, and to adaptively mitigate for it as much as possible. For example, it may be desirable to calibrate, detect, and inform a head-mounted display device wearer of a condition that could potentially cause a motion sickness issue and, if possible, to mitigate the condition.

In at least some embodiments of the present disclosure, the techniques described herein for detecting and mitigation conditions associated with motion sickness or visual fatigue may rely on an analysis of physical behavior (e.g., nodding, swaying, eye movements, etc.) to assess motion sickness or visual fatigue. For example, if a user is feeling unwell while using a head-mounted display device of an augmented or virtual reality system, the user's head may be oscillating back and forth because the user is getting a little dizzy. In this case, an inertial measurement unit of the head-mounted display device may report some erratic, oscillating values. Research has shown that deviations in yaw, pitch, and roll may serve as catalysts for motion sickness. Thus, any results of tracking and measuring these movements may be used to detect the possibility or probability of motion sickness or visual fatigue. As will be described in further detail herein, the inventors of the present disclosure have discovered methods and systems for detecting and mitigation conditions associated with motion sickness or visual fatigue in augmented or virtual reality systems including head-mounted display devices. In some embodiments, these techniques may include a system for calibrating, detecting, and notifying a head-mounted display user of possible motion sickness or visual fatigue symptoms due to content interaction, based on sudden changes to a 6×1 vector of inertial measurement unit data received from a head-mounted display device that exceed calibration-generated gradient thresholds. In some embodiments, these techniques may allow augmented or virtual reality systems to adaptively change, at the host system, a graphics spatial quality settings and/or a rendering resolution for content to be displayed on a head-mounted display device and/or to adaptively change the effective field of view on a head-mounted display device to mitigate for multiple possible causes of visual fatigue and/or motion sickness including, but not limited to, higher instantaneous round-trip latency due to a lower instantaneous host render frame rate, and motion parallax. For example, by narrowing the effective field of view, the spatial quality and/or the refresh rate of the displayed content may be improved, which may mitigate against any motion parallax that is happening.

Figure 2:
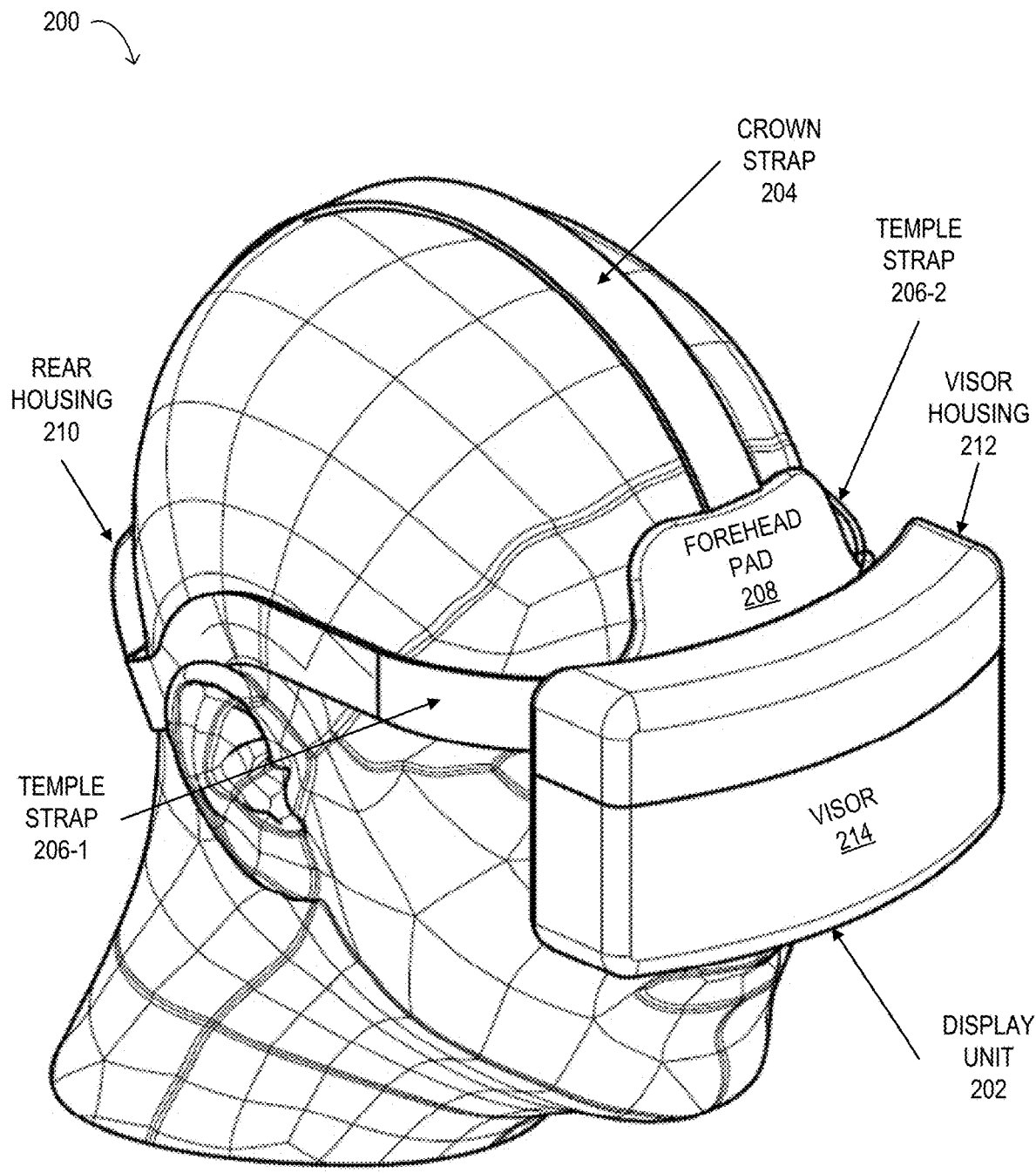
FIG. 2 is a three quarter view of selected elements of an embodiment of a head-mounted display device.

FIG. 2 depicts a three quarter view of selected elements of an embodiment of a head-mounted display device 200. As shown in FIG. 2, head-mounted display device 200 includes a display unit 202, a plurality of straps including a crown strap 204, a temple strap 206-1, and a temple strap 206-2, a forehead pad 208, and a rear housing 210. Head-mounted display device 200 may comprise a head-mounted virtual reality display, a head-mounted augmented reality display, a head-mounted mixed reality display, or another type of head-mounted display. Display unit 202 may include a visor housing 212 and a visor 214 coupled proximate a front side of visor housing 212. In embodiments in which head-mounted display device 200 is used in an augmented or mixed reality system, rather than a purely virtual reality system, visor 214 may be at least partially transparent. Forehead pad 208 may be coupled to visor housing 212 proximate a top side of visor housing 212. Crown strap 204 may include a first end coupled to visor housing 212 proximate a top center portion of visor housing 212 and a second end coupled to rear housing 210 proximate a top center portion of rear housing 210. Temple strap 206-1 may include a first end coupled to forehead pad 208 proximate a first side of visor housing 212 and a second end coupled to rear housing 210 proximate a first side of rear housing 210. Temple strap 206-2 may include a first end coupled to forehead pad 208 proximate a second side of visor housing 212 opposite the first side of visor housing 212 and a second end coupled to rear housing 210 proximate a second side of rear housing 210 opposite the first side of rear housing 210. In FIG. 2, a user is shown wearing head-mounted display device 200 on their head with display unit 202 positioned in front of their face and looking straight toward visor 214.

Typically, a head-mounted display device used with an augmented or virtual reality system includes multiple inertial measurement unit sensors. For example, a typical inertial measurement unit implemented in a head-mounted display device may report a respective acceleration of the head-mounted display device in each of six degrees of freedom or axes (fore-aft, lateral, vertical, yaw, pitch, and roll). A sudden change in the movement of the head-mounted display device with respect to a degree of freedom or axis of interest, in which the measured value or a gradient associated with multiple measured values for the movement of the head-mounted display device with respect to the degree of freedom or axis of interest, exceeds a measurement or gradient threshold determined through a calibration exercise, can may be used to detect a condition that could potentially induce motion sickness symptoms.

In at least some embodiments, the techniques described herein may include monitoring timing information associated with rendering graphics data, such as an instantaneous measurement of the number of rendered frames per second (FPS) on the host system (such as information handling system 100). This information, along with data indicating the occurrence of motion parallax (which may be detected using an analysis of rendered content and real-world data through Simultaneous Localization and Mapping (SLAM), and the use of any of a variety of techniques for detecting motion sickness or visual fatigue user symptoms, including those described herein, to trigger actions to, at least partially, mitigate a condition associated with motion sickness or visual fatigue. Simultaneous localization and mapping refers to the computational problem of constructing or updating a map of an unknown environment while simultaneously keeping track of an agent's location within it. The actions taken to mitigate the condition associated with motion sickness or visual fatigue may include reducing a graphics spatial quality setting or a graphics rendering resolution or changing an effective field of view. In some embodiments, simultaneous localization and mapping may be performed using cameras mounted on a head-mounted display device in an orientation at which the cameras face the world-view, using, for example, Near-Infrared (NIR) spectroscopy. Near-infrared spectroscopy is a spectroscopic method that uses the near-infrared region of the electromagnetic spectrum (from about 700 nm to 2500 nm).

Figure 3:
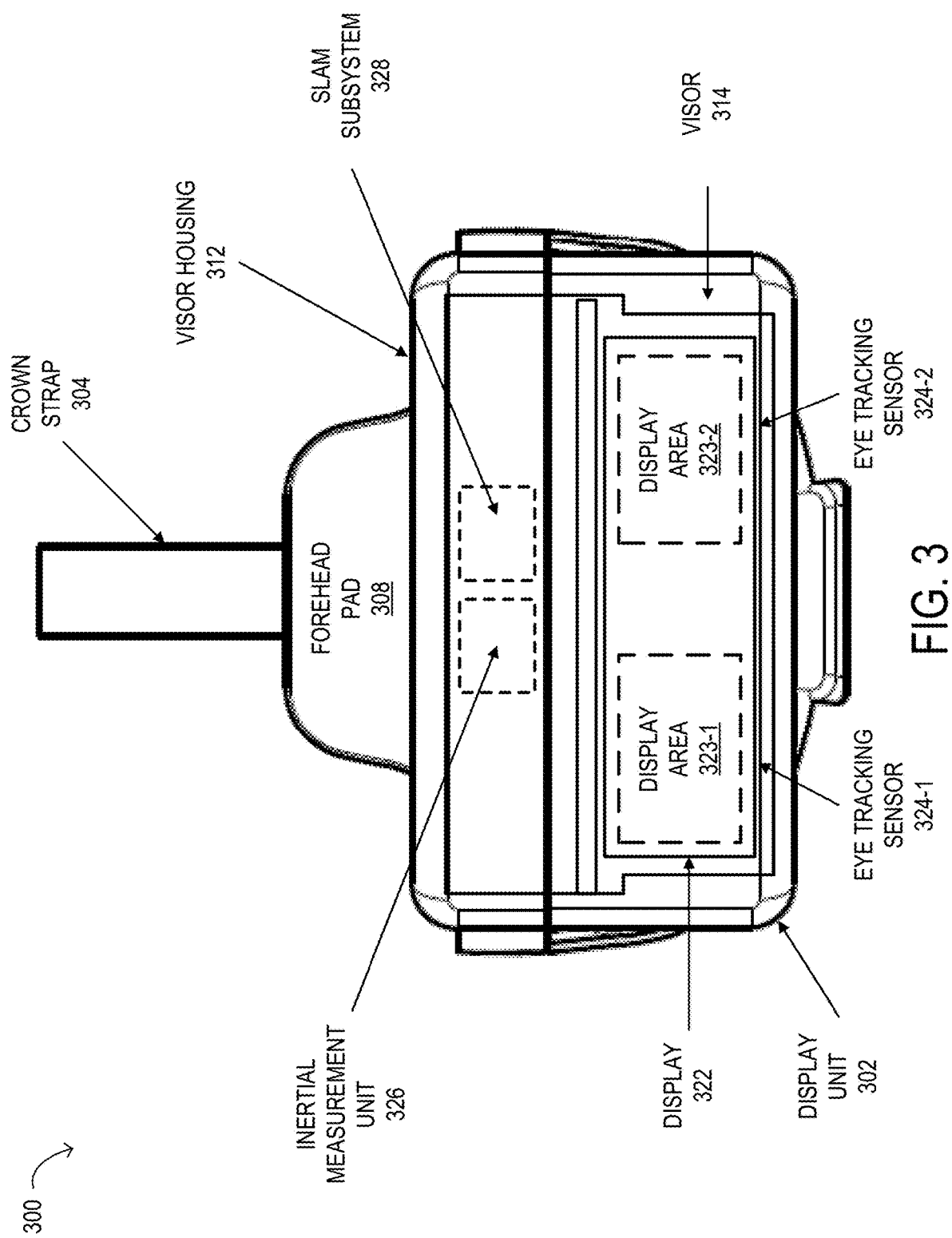
FIG. 3 is a front view of selected elements of an embodiment of a head-mounted display device.

Turning now to FIG. 3, a front view of selected elements of an embodiment of a head-mounted display device 300 is depicted. Head-mounted display device 300 may be structurally and functionally similar to head-mounted display device 200 described above with reference to FIG. 2. Head-mounted display device 300 includes a display unit 302, a crown strap 304, a forehead pad 308, a visor housing 312, and a visor 314 coupled to visor housing 312. In embodiments in which head-mounted display device 300 is used in an augmented or mixed reality system, rather than a purely virtual reality system, visor 314 may be at least partially transparent. Display unit 302 may include various components including a display 322, eye tracking sensors 324-1 and 324-2, inertial measurement unit (IMU) 326, a SLAM subsystem 328, and lenses (not illustrated), which may be in visor housing 312. Note that while inertial measurement unit 326 and SLAM subsystem 328 are shown in particular positions within head-mounted display device 300, in other embodiments, inertial measurement unit 326 and/or SLAM subsystem 328 may be located in other positions within head-mounted display device 300. Display 322 may include one or more liquid crystal displays (LCDs), optical projection systems, monitors, or another type of display element, on which head-mounted display device 300 may display a rendered image of a virtual object. For example, which head-mounted display device 300 may display a rendered image of a virtual object on an LCD or may project a rendered image onto visor 314. In various embodiments, head-mounted display device 300 may include a single display 322 or multiple displays 322, each of which may be associated with a respective eye of a user and/or with a respective lens for a respective eye of a user. For example, display 322 may include a display area 323-1 associated with a right eye lens for the user's right eye and a display area 323-2 associated with a left eye lens for the user's left eye. Similarly, each of the eye tracking sensors 324 may be located proximate a perimeter of a respective lens, proximate a bottom portion of each lens, or at another location, and may be associated with a respective eye of a user. For example, eye tracking sensor 324-1 may capture eye tracking information associated with the user's right eye and eye tracking sensor 324-2 may capture eye tracking information associated with the user's left eye. The eye tracking information may include one or more of a position of an eye, a location of an eye, a pupil location of an eye, an ocular center of an eye, an angle of an eye, and a direction of gaze of an eye (sometimes referred to herein as eye gaze tracking data), and other types of eye tracking information.

Head-mounted display device 300 may include an inside-out tracking device to capture inside-out tracking information relative to a global ground coordinate associated with head-mounted display device 300 and an inertial measurement unit 326 to capture inertial measurement unit information associated with head-mounted display device 300. The inside-out tracking device may include a simultaneous localization and mapping (SLAM) subsystem 328, which may include one or more SLAM cameras or other SLAM sensors. The SLAM subsystem 328 may provide localization and mapping of a user's environment. The information provided by SLAM subsystem 328 may include a position of head-mounted display device 300, a location of head-mounted display device 300, environmental information of the user's environment including surface information, depth information, distance information of objects surrounding the user, or other types of environment information and conditions, or combinations thereof, associated with head-mounted display device 300 and the user's environment. The inertial measurement unit 326 may include an accelerometer, a gyroscope, a magnetometer, an optical sensor, a global position system (GPS) device, or other types of devices. In various embodiments, the information provided by inertial measurement unit 326 may include a position of head-mounted display device 300, an orientation of head-mounted display device 300, a respective linear acceleration of head-mounted display device 300 in each of six degrees of freedom or axes, and/or an angular velocity of head-mounted display device 300.

Head-mounted display device 300 may also comprise one or more user input interfaces such as buttons disposed in head-mounted display device 300, a voice recognition device, a gesture recognition device, a motion detection device, an adjustment input device, or another type of user input interface device, that a user may use to provide user input data and commands to head-mounted display device 300 (not shown). In one or more embodiments, head-mounted display device 300 may be coupled to an information handling system, such as information handling system 100, that serves as a host system for head-mounted display device 300.

Figure 4:
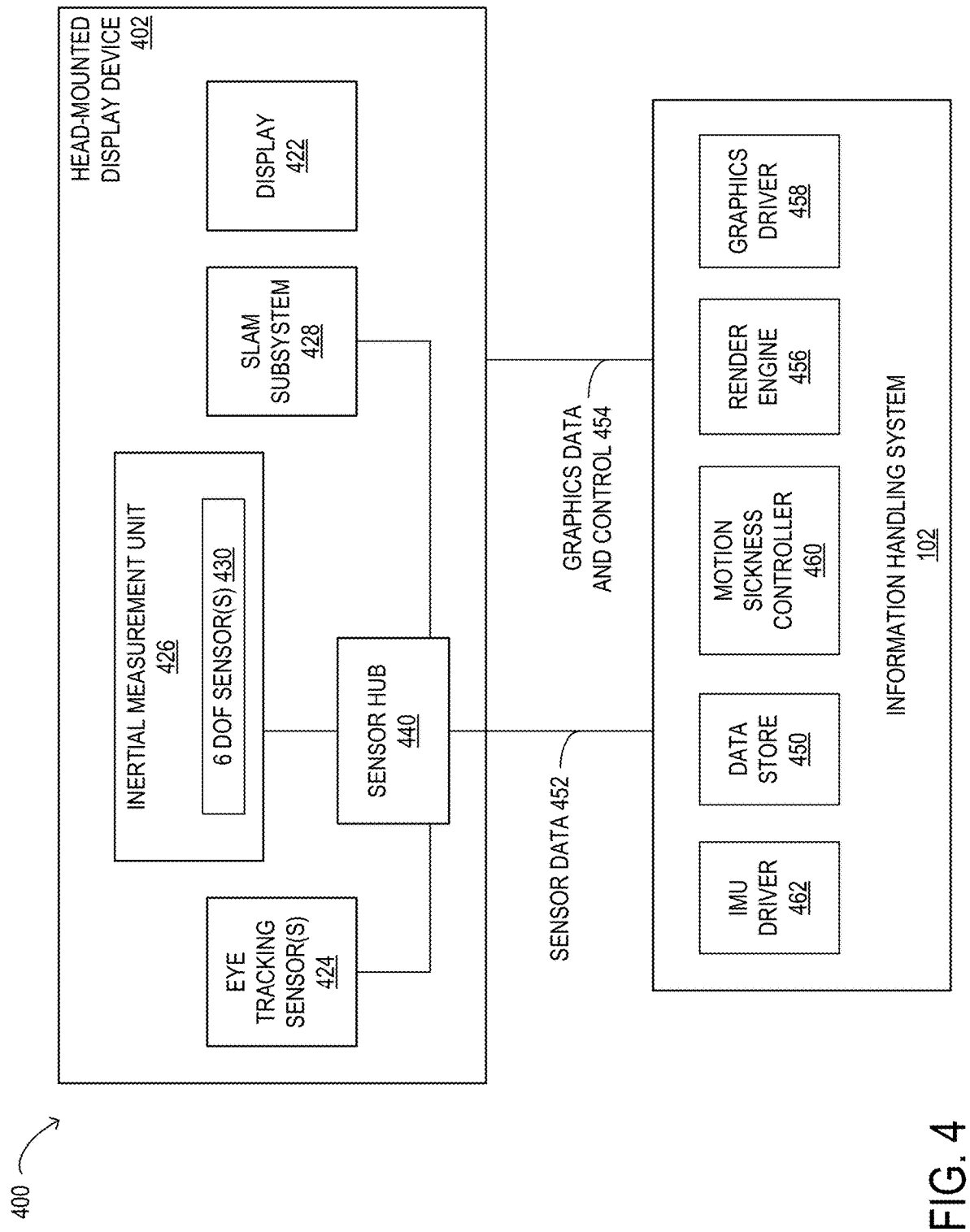
FIG. 4 is a block diagram of selected elements of an augmented or virtual reality system including a head-mounted display device coupled to an information handling system, according to some embodiments.

FIG. 4 is a block diagram of selected elements of an augmented or virtual reality system 400 including a head-mounted display device 402 coupled to an information handling system 102, according to some embodiments. Head-mounted display device 402 may be structurally and functionally similar to head-mounted display device 200 described above with reference to FIG. 2 or head-mounted display device 300 described above with reference to FIG. 3. Information handling system 102 may be structurally and functionally similar to information handling system 100 illustrated in FIG. 1 and described above. In the illustrated embodiment, system 400 includes head-mounted display device 402, which includes display 422, eye tracking sensors 424 inertial measurement unit 426 including six-degree-of-freedom sensors 430, SLAM subsystem 428, and a sensor hub 440. Sensor hub 440 is coupled to eye tracking sensors 424, inertial measurement unit 426, and SLAM subsystem 428. Sensor hub 440 may transmit position information or other sensor data 452 to information handling system 102 over a wired or wireless connection.

In the illustrated embodiment, information handling system 102 may include IMU driver 462, which may provide control signals to inertial measurement unit 426 and/or process, parse, or aggregate data captured by various IMU sensors and received by information handling system 102. Information handling system 102 also includes data store 450, which may store calibration and setup data, gradient thresholds for IMU sensors, or other data usable to implement the methods described herein. Information handling system 102 also includes render engine 456 for rendering content to be displayed by head-mounted display device 402, graphics driver 458 for controlling a video adapter (e.g., a video card, GPU, or graphics chipset) that drives display 422, and motion sickness controller 460. Information handling system 102 may transmit graphics data and control signals 454 to head-mounted display device 402. For example, information handling system 102 may transmit control signals usable to control at least some operations of display 422 and/or inertial measurement unit 426 of head-mounted display device 402. In at least some embodiments, sensor hub 400 may transmit sensor data 452 to information handling system 102 and motion sickness controller 460 may utilize sensor data 452 to detect and mitigate conditions associated with motion sickness and/or visual fatigue for users wearing head-mounted display devices.

While in the example embodiment illustrated in FIG. 4, head-mounted display device 402 includes a sensor hub 440 through which sensor data captured by multiple sensors of different types is communicated to a host system, such as information handling system 102, in other embodiments, a head-mounted display device might not include a sensor hub. For example, in some embodiments, each sensor included in a head-mounted device may transmit or otherwise communicate sensor data captured by the sensor to information handling system 102. In still other embodiments a sensor hub may be located in information handling system 102 (rather than in head-mounted display device 402) and may be operable to receive sensor data from multiple sensors of different types located on the head-mounted display device that is communicated to the host system. In yet another embodiment, some or all of the elements illustrated in FIG. 4 as being elements of head-mounted display device 402 and some or all of the elements illustrated in FIG. 4 as being elements of information handling system 102 may reside in a standalone head-mounted display device that does not rely on a separate host system for operation.

In at least some embodiments of the present disclosure, any of all of the sensor data received from eye tracking sensors 424, SLAM subsystem 428, and inertial measurement unit 426 may be monitored during a calibration exercise to determine the respective gradient thresholds to be associated with each of the six degrees of freedom or with other measurements. In some embodiments, the calibration exercise may be performed for a given system or head-mounted display device thereof without regard to the user who is wearing the head-mounted display device. In other embodiments, the calibration exercise may be specific to a particular user who is wearing the head-mounted display device. In various embodiments, any combination of sensor data received from eye tracking sensors 424, SLAM subsystem 428, and/or inertial measurement unit 426 may be used in detecting and mitigating conditions associated with motion sickness or visual fatigue.

In various embodiments, a calibration exercise may include one or more of the following:

Prompting a user to perform a series of tasks while measuring deviations in sensor data across time and asking the user to self-report their feelings on a motion-sickness scale, such as a Likert-type rating scale.

Prompting a user to perform a series of tasks while measuring deviations in sensor data from beginning to end and/or across time and using known deviations from various axes to confirm fatigue.

Using artificial intelligence (AI) and/or machine learning (ML) techniques to track behavioral responses to environment variables across time. For example, AI may be applied to large population data and ML may be used to adjust for user-specific variances.

Measuring deviations from the vertical and lateral anatomical coordinates for center-of-mass (CM), distance moved, and speed of movement, then correlating the data with known research related to head movements (e.g., head bobbing) and their respective relationships of motion sickness and fatigue. In some embodiments, this technique may be used to determine the gradient thresholds to be associated with each of the six degrees of freedom or with other measurements.

Figure 5:
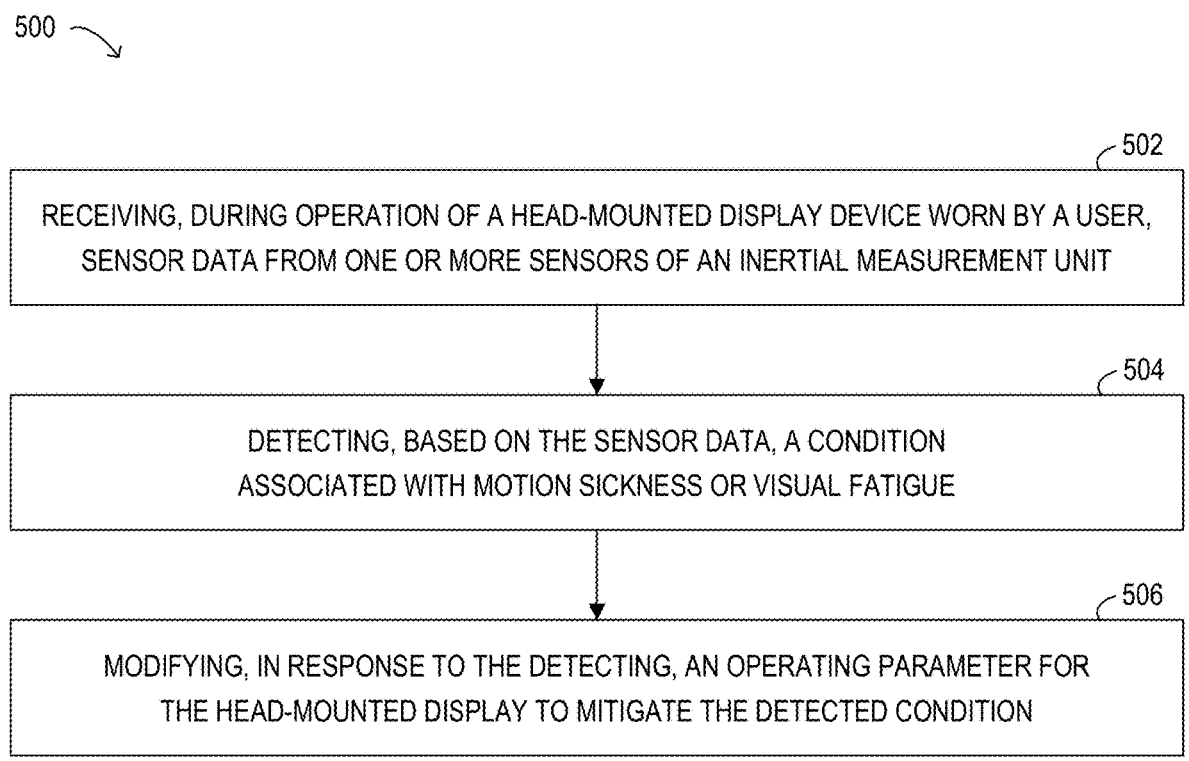
FIG. 5 illustrates a flowchart of selected elements of an embodiment of a method for detecting and mitigating motion sickness in augmented and virtual reality systems that include head-mounted displays.

FIG. 5 illustrates a flowchart of selected elements of an embodiment of a method 500 for detecting and mitigating motion sickness (or visual fatigue) in augmented and virtual reality systems that include head-mounted displays. In some embodiments, method 500 may be performed by a motion sickness controller, such as motion sickness controller 480 of information handling system 100 illustrated in FIG. 4, based on data received from a head-mounted display device, such as head-mounted display device 200 illustrated in FIG. 2, head-mounted display device 300 illustrated in FIG. 3, or head-mounted display device 402 illustrated in FIG. 4. It is noted that certain operations described in method 500 may be optional or may be rearranged in different embodiments.

Method 500 may begin at 502, by receiving, during operation of a head-mounted display device worn by a user, sensor data from one or more sensors of an inertial measurement unit of the head-mounted display device. For example, the inertial measurement unit, which may be similar to inertial measurement unit 326 illustrated in FIG. 3 or inertial measurement unit 426 illustrated in FIG. 4, may report data indicating a respective acceleration of the head-mounted display device with respect to each of six degrees of freedom or axes. In some embodiments, the information handling system, or a motion sickness controller thereof, may also receive eye gaze tracking data captured by eye tracking sensors 324 illustrated in FIG. 3 or eye tracking sensors 424 illustrated in FIG. 4 and/or Simultaneous Localization and Mapping (SLAM) data received from SLAM subsystem 328 illustrated in FIG. 3 or SLAM subsystem 428 illustrated in FIG. 4. In some embodiments, the sensor data may be communicated to the information handling system, or a motion sickness controller thereof, by a sensor hub, such as sensor hub 440.

At 504, the method may include detecting, based on the sensor data, a condition associated with motion sickness or visual fatigue in augmented and virtual reality systems that include head-mounted displays. In some embodiments, detecting a condition associated with motion sickness or visual fatigue may include, for each of the six degrees of freedom or axes, computing an average of recent measurement values, to avoid over-reacting to spurious, instantaneous, noisy data, and a gradient for the average values. Detecting the condition may also include determining that, for at least one of the six degrees of freedom or axes, the gradient exceeds a gradient threshold value for the corresponding degrees of freedom or axis. In various embodiments, the gradient threshold value may be a predetermined default value, a value set through a calibration exercise, a user-specified value, or an application- or context-specific value.

At 506, method 500 may include modifying, in response to detecting a condition associated with motion sickness or visual fatigue, an operating parameter for the head-mounted display to, at least partially, mitigate the detected condition. For example, modifying the control parameter may include sending a control signal to a render engine, such as render engine 456 illustrated in FIG. 4, to change the rendering resolution for the graphics data to be displayed by the head-mounted display device. In another example, modifying the control parameter may include sending a control signal to a render engine, such as render engine 456 illustrated in FIG. 4, to change the spatial quality for the graphics data to be displayed by the head-mounted display device. In yet another example, modifying the control parameter may include sending a control signal to a graphics driver, such as graphics driver 458 illustrated in FIG. 4, to change the effective field of view within which graphics data is display on the head-mounted display device. In some embodiments, and under certain conditions, two or more of these control parameter changes may be made to mitigate a particular detected condition associated with motion sickness or visual fatigue.

As described in more detail below, the operations shown in FIG. 5 may be repeated at predetermined or adaptive intervals to detect and mitigate conditions associated with motion sickness or visual fatigue. The frequency at which the operations illustrated in FIG. 5 are repeated may be dependent on the frequency at which sensor data is measured by sensors on the head-mounted display device and communicated to the information handling system. In some embodiments, the frequency at which the operations illustrated in FIG. 5 are repeated may be less than or equal to the sensor frequency. In some embodiments, the frequency at which the operations are repeated may be application-dependent, content-dependent, or user-specific.

In some embodiments, the techniques described herein for detecting conditions associated with motion sickness or visual fatigue may be implemented as a steady state software service executing on a host system (such as information handling system 100 illustrated in FIG. 1 or information handling system 102 illustrated in FIG. 4) that monitors IMU sensor data vectors per IMU operating frequency, and uses hysteresis-based averaging to detect possible motion sickness or visual fatigue symptoms in a user. For example, in some embodiments, motion sickness controller 460 illustrated in FIG. 4 may implement a software service for detecting conditions associated with motion sickness or visual fatigue. In some embodiments, the software service may compare observed IMU sensor values against thresholds set at a calibration stage, as described herein.

Figure 6:
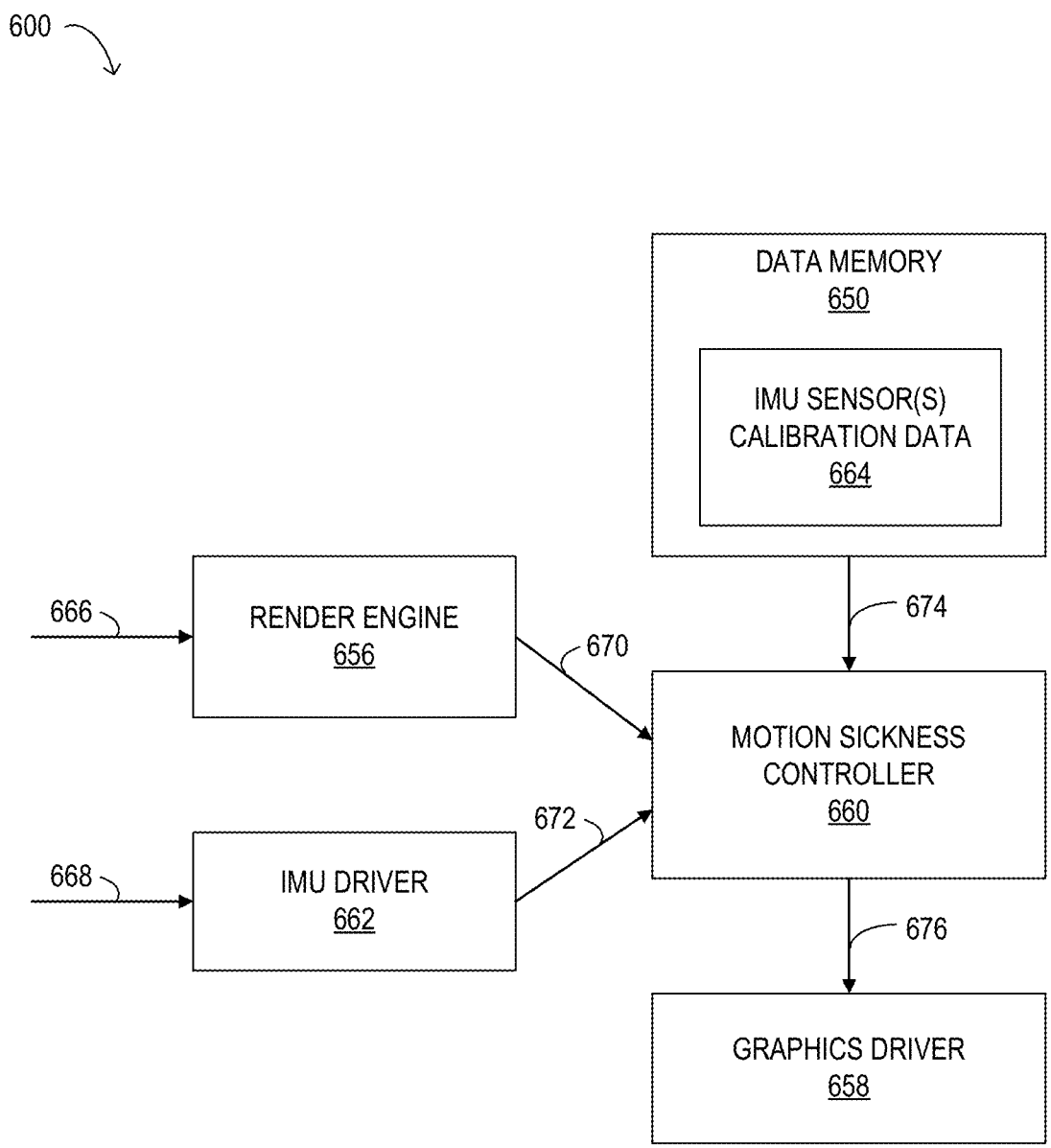
FIG. 6 illustrates a data flow diagram depicting interactions between selected elements of an augmented or virtual reality system to detect conditions associated with motion sickness or visual fatigue, according to some embodiments.

FIG. 6 illustrates a data flow diagram depicting interactions between selected elements of an augmented or virtual reality system to detect conditions associated with motion sickness or visual fatigue, according to some embodiments. Illustrated in FIG. 6 are render engine 656, which may be similar to render engine 456 illustrated in FIG. 4, IMU driver 662, which may be similar to IMU driver 462 illustrated in FIG. 4, motion sickness controller 660, which may be similar to motion sickness driver 460 illustrated in FIG. 4, and graphics driver 658, which may be similar to graphics driver 458 illustrated in FIG. 4. Also illustrated in FIG. 6 is data store 650 storing data usable to implement the methods described herein including, for example, calibration data for various IMU sensors (shown as 664). In the illustrated example, motion sickness controller 660 may receive, access, or otherwise obtain at least some of the IMU sensor calibration data 664 as inputs 674 to the methods described herein for detecting conditions associated with motion sickness or visual fatigue. In some embodiments, IMU sensor calibration data 664 may include, for each of six degrees of freedom or axes, a respective gradient threshold value determined during a calibration exercise.

In the illustrated embodiment, render engine 656 may receive SLAM data 666 and/or other information from a SLAM subsystem of a head-mounted display device, such as SLAM subsystem 328 illustrated in FIG. 3 or SLAM subsystem 428 illustrated in FIG. 4. Based, at least in part, on this input, render engine 656 may provide rendering parameters 670 (including frame timing information, such as a frames per second or FPS) to motion sickness controller 660. In the illustrated embodiment, IMU driver 662 receives IMU data 668 from an inertial measurement system of the head-mounted display device, such as inertial measurement system 326 illustrated in FIG. 3 or inertial measurement system 426 illustrated in FIG. 4, and provides 6×1 sensor data representing inertial measurements with respect to respective degrees of freedom or axes (shown as 672) to motion sickness controller 660. Based at least on inputs 670, 672, and 674, motion sickness controller 660 may be operable to detect conditions associated with motion sickness or visual fatigue. In some embodiments, in response to detecting a condition associated with motion sickness or visual fatigue, motion sickness controller 660 may be operable to transmit data representing an alert or warning 676 to graphics driver 658 for display on the head-mounted display device. For example, the alert or warning may be presented to the user wearing the head-mounted display device as an overlay displayed on top of other rendered content, or as modified graphics content. In some embodiments, in addition to presenting an alert or warning, motion sickness controller 600 may be operable to pause the content currently being display or to prompt the user to pause the content if they are feeling unwell.

In some embodiments, a user may place head-mounted display device 402 on their head with display 422 positioned in front of their face and looking straight toward displays 422 and provide user input to head-mounted display 400 to begin a calibration process. For example, calibration of gradient thresholds for fore-aft, lateral, vertical, yaw, pitch and roll may be performed while a user is immersed in augmented or virtual reality content. The calibration may be performed for a typical user immersed in "normal" interactive content (rather than stressful or intense content) on the head-mounted display device. The thresholds for fore-aft, lateral, vertical, yaw, pitch and roll may represent different scalar values. Calibration may be performed per user and may be content based, or in an initial calibration, may be factory based for range of use cases to be supported by the head-mounted display device. In some embodiments, results of the calibration, e.g., the gradient threshold values, may subsequently be biased down or up based on an indication of the stressfulness or intensity of the content being displayed or based on user preferences indicating a low, medium, or high tolerance to motion sickness input through a user interface setup or configuration menu.

In some embodiments, a calibration exercise may be performed to determine calibration and configuration settings for the method including any or all of the following:
maximum and minimum spatial resolution settings for rendering content, which may be configurable by the user, with defaults set.
maximum and minimum spatial quality settings for rendering content, which may be configurable by the user, with defaults set.
a mapping between motion parallax velocity and field of view, which may be calibrated for a specific head-mounted display device user as part of user onboarding.

In some embodiments, calibration exercises may be used to calibrate the head-mounted display devices and/or corresponding host systems for users selected from different demographic groups, from different age ranges, or having other distinguishing characteristics, to set curves for the normal distribution of conditions in which "most" users (based on a normal distribution 3-sigma, for example) experience discomfort of some kind. In one example, a per-user calibration sequence may include a set of content sequences that, for each of the six degrees of freedom or axes, stress the user at increasing stress levels, and the user may be prompted, after each step, to indicate whether he or she is feeling uncomfortable. In this example, the same content may be displayed at different stress levels for each of the axes. In other embodiments, other techniques may be used to test the ranges at which a typical user or a particular user begins to experience symptoms of motion sickness or visual fatigue. Note, however, that different users may respond very differently. For some users, motion parallax may not be an issue, in which case calibration may be skipped altogether and no throttling may need to be done in real time. In some embodiments, a calibration exercise may be performed in a factory setting during manufacturing of the head-mounted display device or before shipping the head-mounted display device, at which time values within calibration tables to be used by the eventual host system can be set appropriately.

Figure 7:
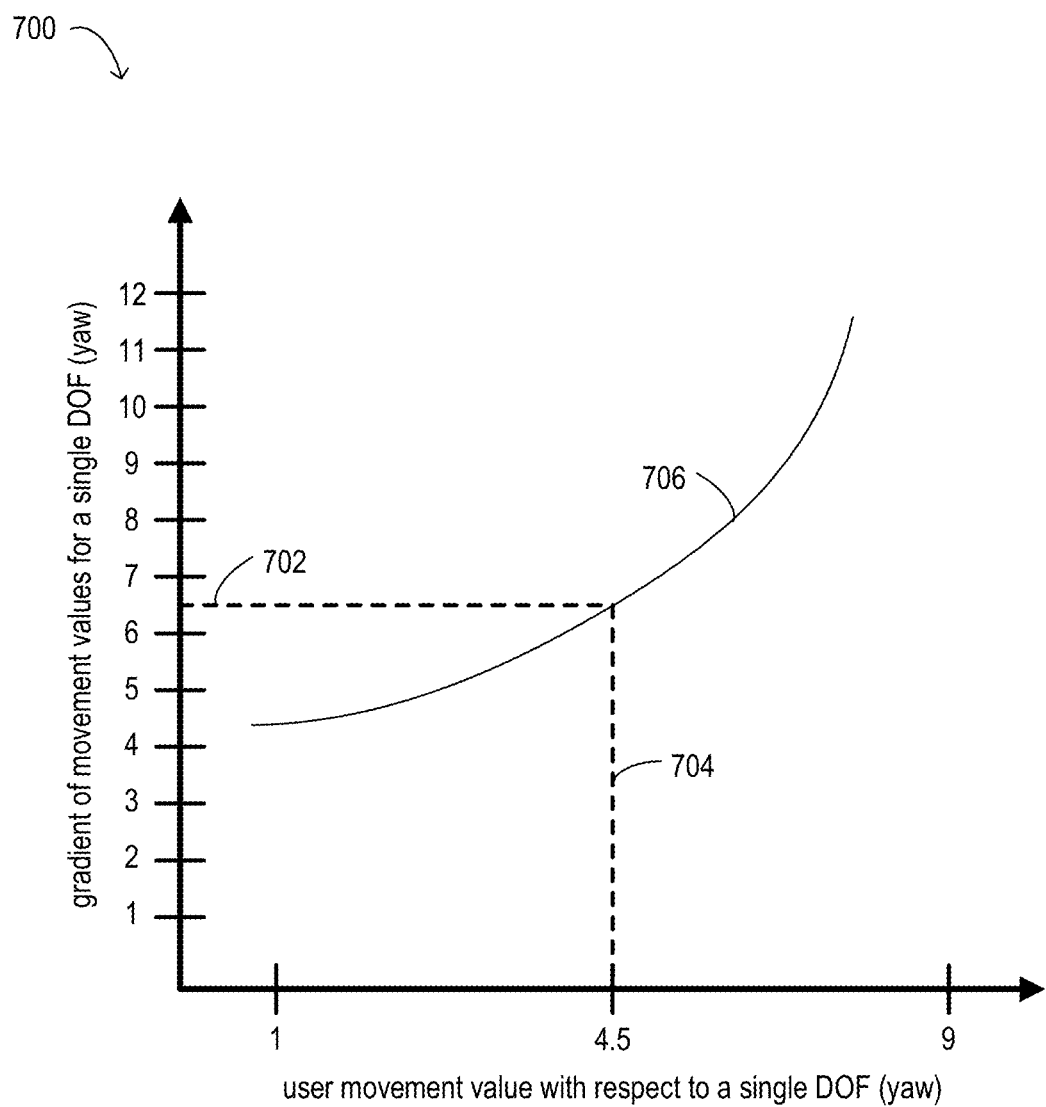
FIG. 7 depicts a calibration graph for inertial measurement unit data with respect to a single degree of freedom, according to some embodiments.

FIG. 7 depicts a calibration graph 700 for inertial measurement unit data with respect to a single degree of freedom, according to some embodiments. More specifically, FIG. 7 depicts a calibration graph 700 in which a hysteresis-based measurement of the change in the yaw of a head-mounted display device is plotted as calibration curve 706. In this example, the values on the x-axis represent yaw movement values and the values on the y-axis represent gradients of yaw values. A typical, or hysteresis-averaged, yaw value is shown on the x-axis as 4.5 (at 704) and a gradient threshold value for the yaw of the head-mounted display device is shown on the y-axis as 6.5 (at 702). The gradient threshold value may be determined as a result of a calibration exercise, and may be a user-, application-, or context-specific value. In at least some embodiments, calibration graphs similar to calibration graph 700 may be generated for each of the six degrees of freedom or axes represented in the IMU data received from an inertial measurement unit of a head-mounted display device and the gradient threshold values for each of the six degrees of freedom or axes may be used by a motion sickness controller, such as motion sickness controller 460 illustrated in FIG. 4 or motion sickness controller 660 illustrated in FIG. 6, in detecting a condition associated with motion sickness or visual fatigue. For example, if it is determined that the IMU data with respect to one or more of the six degrees of freedom or axes is changing at a rate faster than the rate corresponding to their respective gradient threshold values, this may indicate the existence of a condition associated with motion sickness or visual fatigue.

Motion parallax refers to a condition in which objects that are closer in proximity are perceived as moving faster than objects that are further away. In some cases, motion parallax may cause a viewer's eyes to become fatigued very quickly if the user is focused on objects close in proximity that appear to be moving very quickly. In addition, motion parallax may induce motion sickness symptoms when there is an incongruity between what a user's eyes and ears perceive, such as when a head-mounted display device is used in an augmented or virtual reality system.

Figure 8:
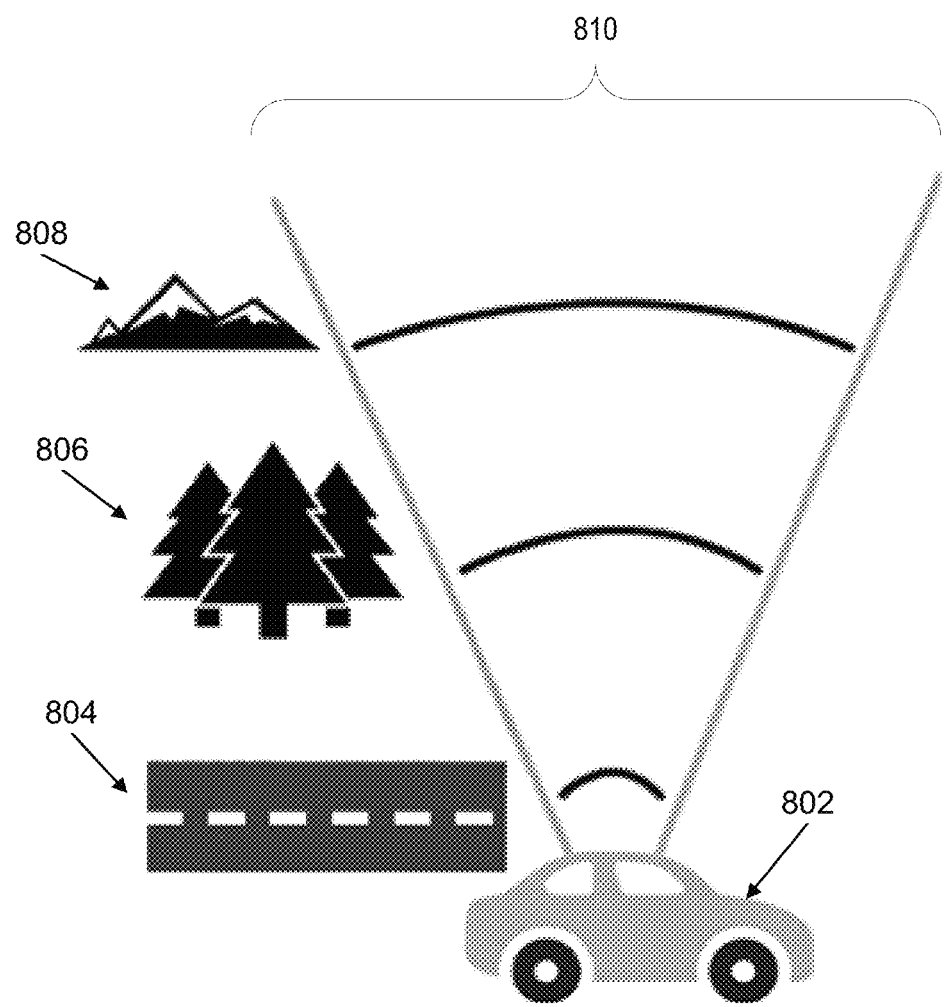
FIG. 8 illustrates a relationship between an effective field of view and motion parallax, according to some embodiments.

FIG. 8 illustrates a relationship between an effective field of view and motion parallax, according to some embodiments. As illustrated in FIG. 8, the pavement (804) immediately outside of a moving car (802) may appear to be moving faster than the trees (806) on the side of the road or the mountains (808) off in the distance. Thus, expanding the field of view (810) may reduce the perception of speed and decrease motion sickness. In some embodiments, an existing video encoding motion estimation may be applied to augmented render engine frames and SLAM data to determine motion parallax on augmented and real world objects and, in response, a motion sickness controller, such as motion sickness controller 460 illustrated in FIG. 4 or motion sickness controller 660 illustrated in FIG. 6, may modify the effective field of view of the head-mounted display device to mitigate any motion sickness or visual fatigue induced or enhanced due to motion parallax.

Figure 9:
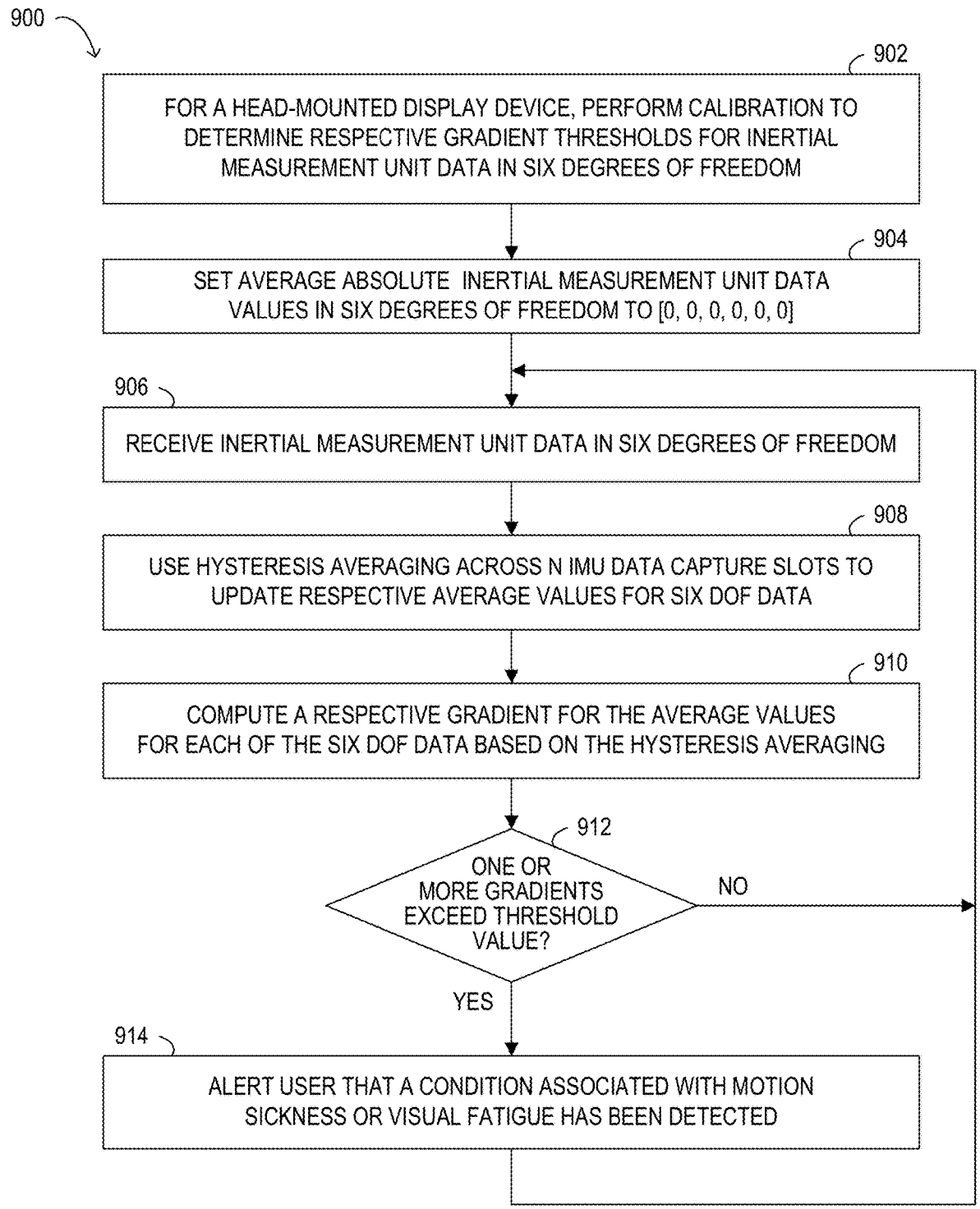
FIG. 9 a flowchart of selected elements of an embodiment of a method for detecting a condition associated with motion sickness or visual fatigue in augmented and virtual reality systems that include head-mounted displays.

FIG. 9 illustrates a flowchart of selected elements of an embodiment of a method 900 for detecting a condition associated with motion sickness or visual fatigue in augmented and virtual reality systems that include head-mounted displays. In some embodiments, method 900 may be performed by a motion sickness controller, such as motion sickness controller 480 of information handling system 100 illustrated in FIG. 4 or motion sickness controller 660 illustrated in FIG. 6, based on data received from a head-mounted display device, such as head-mounted display device 200 illustrated in FIG. 2, head-mounted display device 300 illustrated in FIG. 3, or head-mounted display device 402 illustrated in FIG. 4. It is noted that certain operations described in method 900 may be optional or may be rearranged in different embodiments.

Method 900 may begin at 902, where a calibration exercise is performed for a head-mounted display device to determine respective gradient thresholds for inertial measurement unit data in six degrees of freedom. At 904, the method may include setting average absolute inertial measurement unit data values in six degrees of freedom to [0, 0, 0, 0, 0, 0].

At 906, method 900 includes receiving inertial measurement unit data in six degrees of freedom from an inertial measurement unit data of a head-mounted display device, such as inertial measurement unit 326 illustrated in FIG. 3 or inertial measurement unit 426 illustrated in FIG. 4.

At 908, the method may include using hysteresis averaging across n inertial measurement unit data capture slots to update the respective average values for the inertial measurement unit data in six degrees of freedom or axes. In some embodiments, measuring the gradient for each of these six axes may involve the use of a simple one-tap infinite impulse response (IIR) filter with a delay equal to four times interval at which the operations illustrated in FIG. 9 are repeated (e.g., 4*k milliseconds).

At 910, method 900 may include computing a respective gradient for the inertial measurement unit data in the six degrees of freedom based on the hysteresis averaging. If, at 912, it is determined that one or more of the computed gradients exceed their respective gradient threshold values set during the calibration exercise, method 900 continues at 914. Otherwise, method 900 returns to 906.

At 914, the method may include alerting the user that a condition associated with motion sickness or visual fatigue has been detected, after which method 900 returns to 906. In some embodiments, alerting the user may include sending graphics data to the head-mounted display device representing an overlay to be displayed. The overlay may, for example, include a prompt for the user asking if they are feeling poorly or need to take a break.

In some embodiments, the operations shown in FIG. 9 may be repeated at predetermined or adaptive intervals to detect conditions associated with motion sickness or visual fatigue. The frequency at which the operations illustrated in FIG. 9 are repeated may be dependent on the frequency at which sensor data is measured by sensors on the head-mounted display device and communicated to the information handling system.

In some embodiments, the frequency at which the operations of method 500 illustrated in FIG. 5, method 600 illustrated in FIG. 6, and/or method 900 illustrated in FIG. 9 are repeated may be less than or equal to the sensor frequency. For example, in one embodiment in which the operating frequency of the inertial measurement unit is 800 Hz, such that sensor data is captured and reported to the host system 800 times per second, the operations of methods 500, 600, and/or 900 may be repeated 200 times per second or 400 times per second using every second or fourth data sample reported by the inertial measurement unit, respectively. In some embodiments, the frequency at which the operations are repeated may be application-dependent, content-dependent, or user-specific. For example, if a user is playing a very high-stress, physically active game, the user (and the user's head) may move around a lot more than if they are immersed in casual or slow-paced content. In the first case, the sensor data may change more rapidly than in the second case and it may be beneficial to perform the methods for detecting and mitigating motion sickness or visual fatigue described herein more often to reduce or avoid the symptoms of motion sickness or visual fatigue experienced by the user. Note, however, that a particular user may feel equally unwell in both scenarios.

In some embodiments, the techniques described herein for mitigating conditions associated with motion sickness or visual fatigue may be implemented as a steady state software service executing on a host system (such as information handling system 100 illustrated in FIG. 1 or information handling system 102 illustrated in FIG. 4) that monitors IMU sensor data vectors per IMU operating frequency, and uses hysteresis-based averaging to detect possible motion sickness or visual fatigue symptoms in a user. For example, in some embodiments, a motion sickness controller, such as motion sickness controller 460 illustrated in FIG. 4 or motion sickness controller 660 illustrated in FIG. 6, may implement a software service for mitigating conditions associated with motion sickness or visual fatigue. In some embodiments, the software service may, based on eye gaze tracking data, SLAM data and/or IMU sensor data, manipulate the output of the graphics driver and the render engine to mitigate conditions associated with motion sickness or visual fatigue. More specifically, a software service executing on the host may monitor any or all of the following:

Triggers of visual sickness or fatigue, such as gaze tracking data and/or IMU sensor data.

SLAM data and rendered content, e.g., to measure motion velocity of augmented and real world.

Based on the monitored data, the software service may perform modifications and/or updates to operating parameters for the head-mounted display device, as follows:

If a trigger of visual fatigue or motion sickness is detected, and if the frame rate (to which some limited hysteresis has been applied to avoid overreacting to instantaneous high/low frame rates) has dropped due to the host system being swamped, leading to higher latency, the service may first lower the rendering resolution and the effective field of view in lock step (to avoid a glass-door effect of pixilation), and then lower a spatial quality setting for the render engine.

If a trigger of visual fatigue or motion sickness is detected, and if the frame rate (to which some limited hysteresis has been applied to avoid overreacting to instantaneous high/low frame rates) is within normal bounds, the service may increase the field of view, in steps, to reduce or avoid any potential motion parallax.

Figure 10:
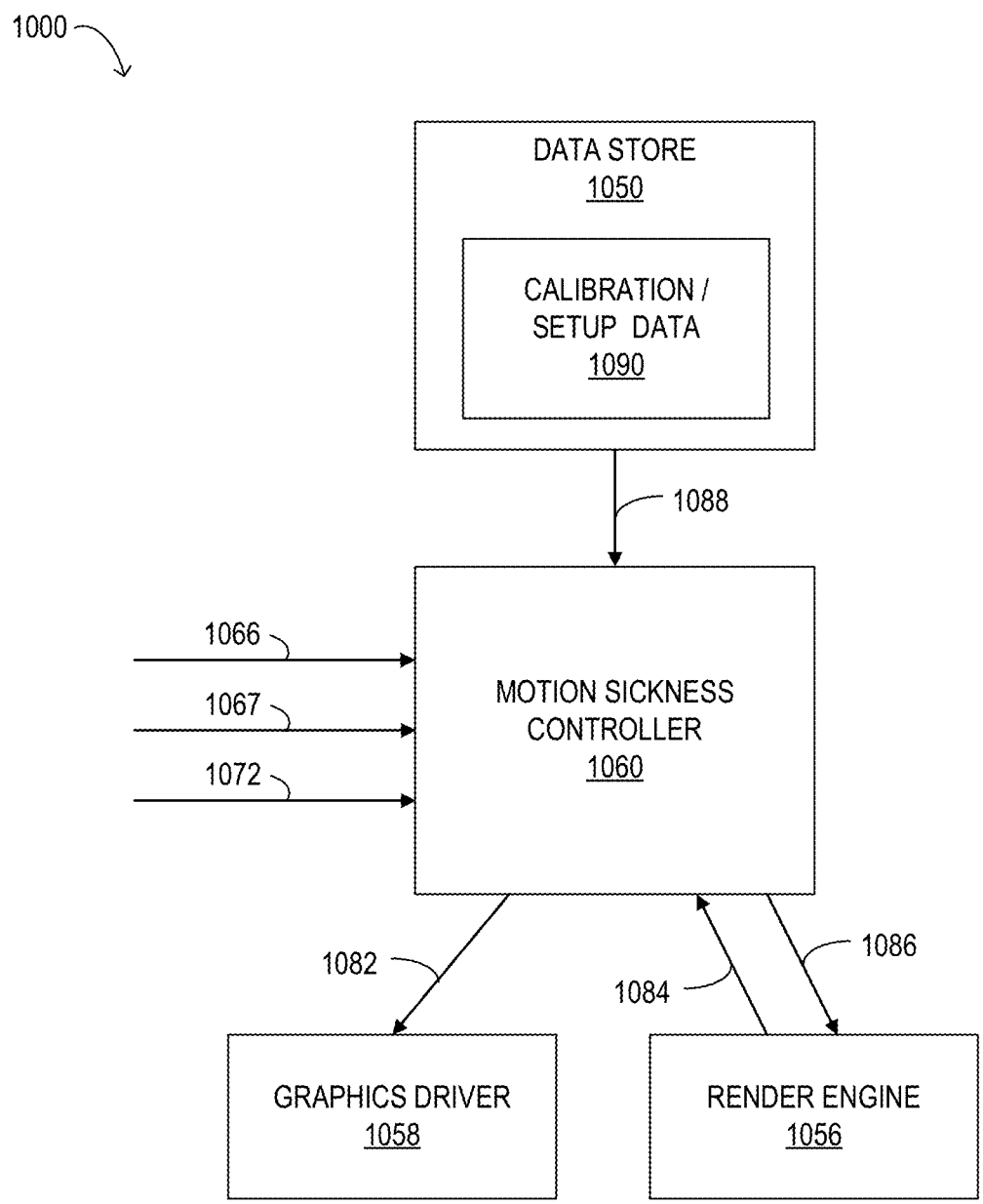
FIG. 10 illustrates a data flow diagram depicting interactions between selected elements of an augmented or virtual reality system to mitigate conditions associated with motion sickness or visual fatigue, according to some embodiments.

FIG. 10 illustrates a data flow diagram depicting interactions between selected elements of an augmented or virtual reality system to mitigate conditions associated with motion sickness or visual fatigue, according to some embodiments. Illustrated in FIG. 10 are render engine 1056, which may be similar to render engine 456 illustrated in FIG. 4 or render engine 656 illustrated in FIG. 6, motion sickness controller 1060, which may be similar to motion sickness driver 460 illustrated in FIG. 4 or motion sickness controller 660 illustrated in FIG. 6, and graphics driver 1058, which may be similar to graphics driver 458 illustrated in FIG. 4 or graphics driver 658 illustrated in FIG. 6. Also illustrated in FIG. 10 is data store 1050 storing data usable to implement the methods described herein including, for example, calibration and setup data for various IMU sensors (shown as 1090). In the illustrated example, motion sickness controller 1060 may receive, access, or otherwise obtain at least some of the calibration and setup data 1090 as inputs 1088 to the methods described herein for mitigating conditions associated with motion sickness or visual fatigue. In some embodiments, calibration and setup data 1090 may include, for each of six degrees of freedom or axes, calibration and setup data determined and stored in data store 1050 during a calibration exercise.

In the illustrated embodiment, motion sickness controller 1060 may receive SLAM data 1066 and/or other information from a SLAM subsystem of a head-mounted display device, such as SLAM subsystem 328 illustrated in FIG. 3 or SLAM subsystem 428 illustrated in FIG. 4. Motion sickness controller 1060 also receives 6×1 sensor data representing inertial measurements with respect to respective degrees of freedom or axes (shown as 1072) as captured by an inertial measurement system of the head-mounted display device, such as inertial measurement system 326 illustrated in FIG. 3 or inertial measurement system 426 illustrated in FIG. 4, eye gaze tracking data 1067 captured by eye tracking sensors 324 illustrated in FIG. 3 or eye tracking sensors 424 illustrated in FIG. 4, and timing information 1084 for rendered frames (e.g., FPS) received from render engine 1056.

Based at least on inputs 1066, 1067, 1072, 1084, and 1088, motion sickness controller 1060 may be operable to mitigate conditions associated with motion sickness or visual fatigue. For example, in some embodiments, in response to detection of a condition associated with motion sickness or visual fatigue, motion sickness controller 1060 may be operable to transmit a control signal 1086 to render engine 1056 to change the rendering resolution for the graphics data to be displayed by the head-mounted display device, to transmit a control signal to render engine 1056 to change the spatial quality for the graphics data to be displayed by the head-mounted display device, or to transmit a control signal 1082 and/or updated graphics content to graphics driver 1058 to change the effective field of view within which graphics data is display on the head-mounted display device. In some embodiments, and under certain conditions, two or more of these control parameter changes may be made to mitigate a particular detected condition associated with motion sickness or visual fatigue.

Figure 11A:
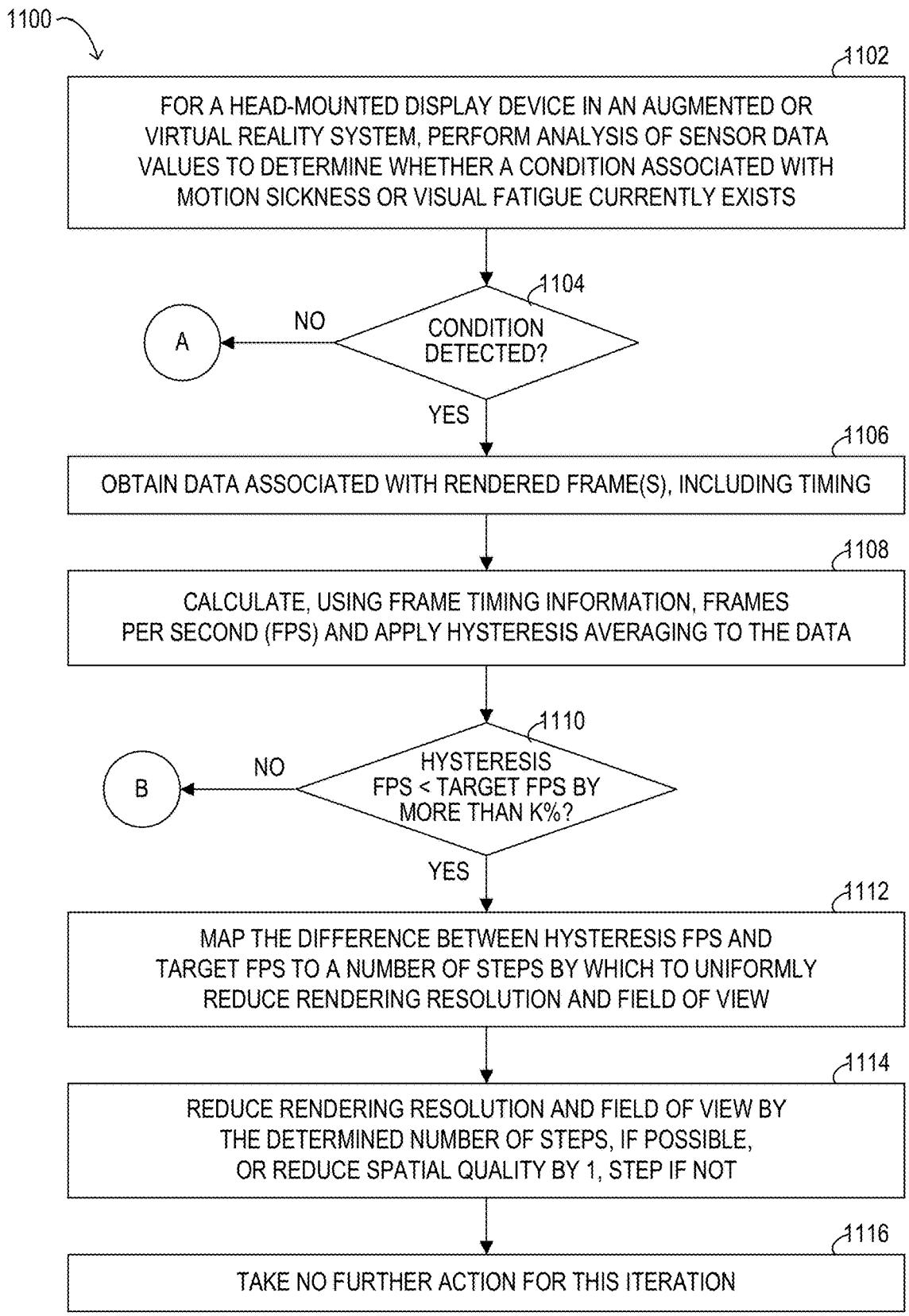
FIGS. 11A-11C illustrate a flowchart depicting selected elements of an embodiment of a method for mitigating a condition associated with motion sickness or visual fatigue in augmented and virtual reality systems that include head-mounted displays.
Figure 11B:
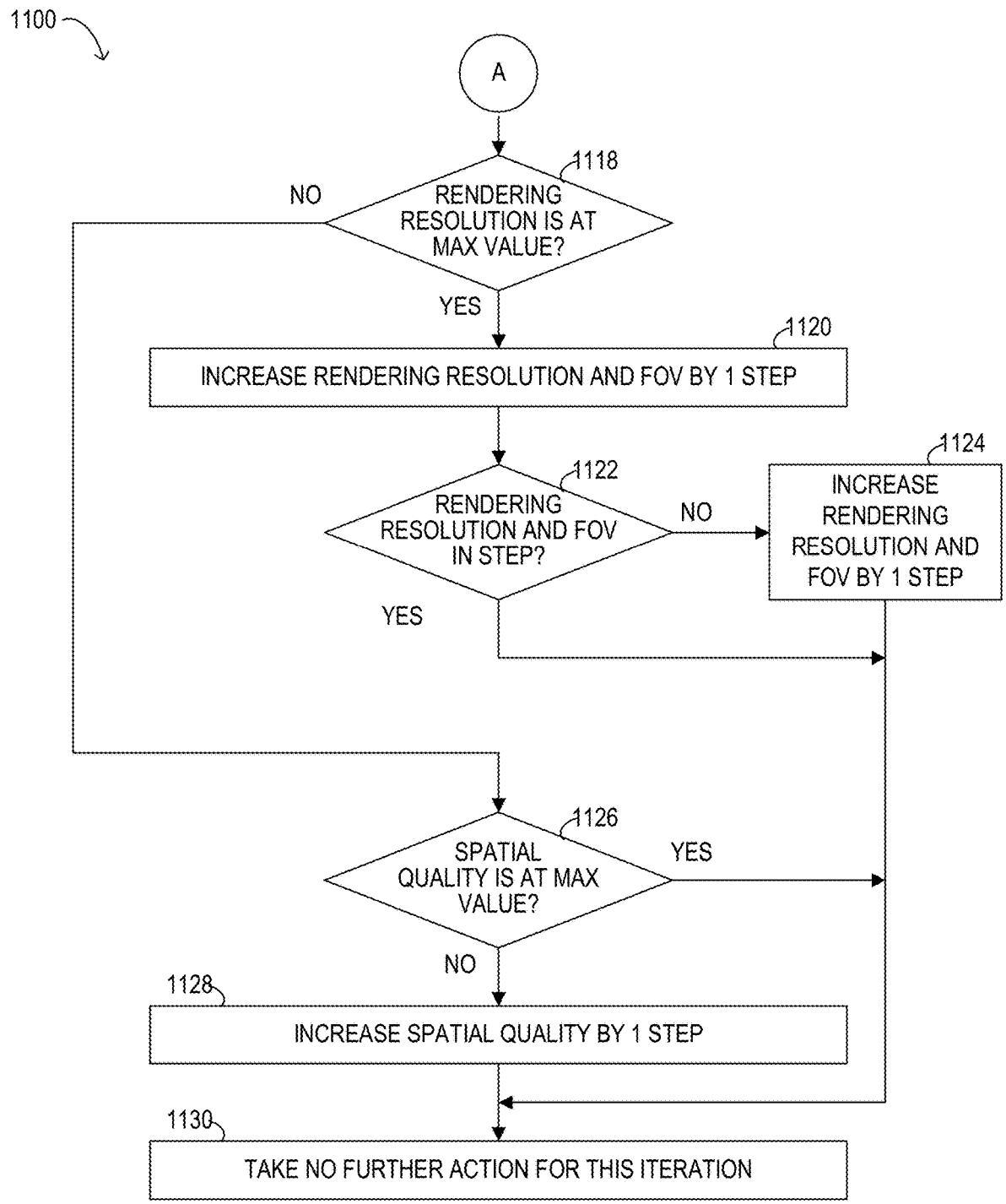
Figure 11C:
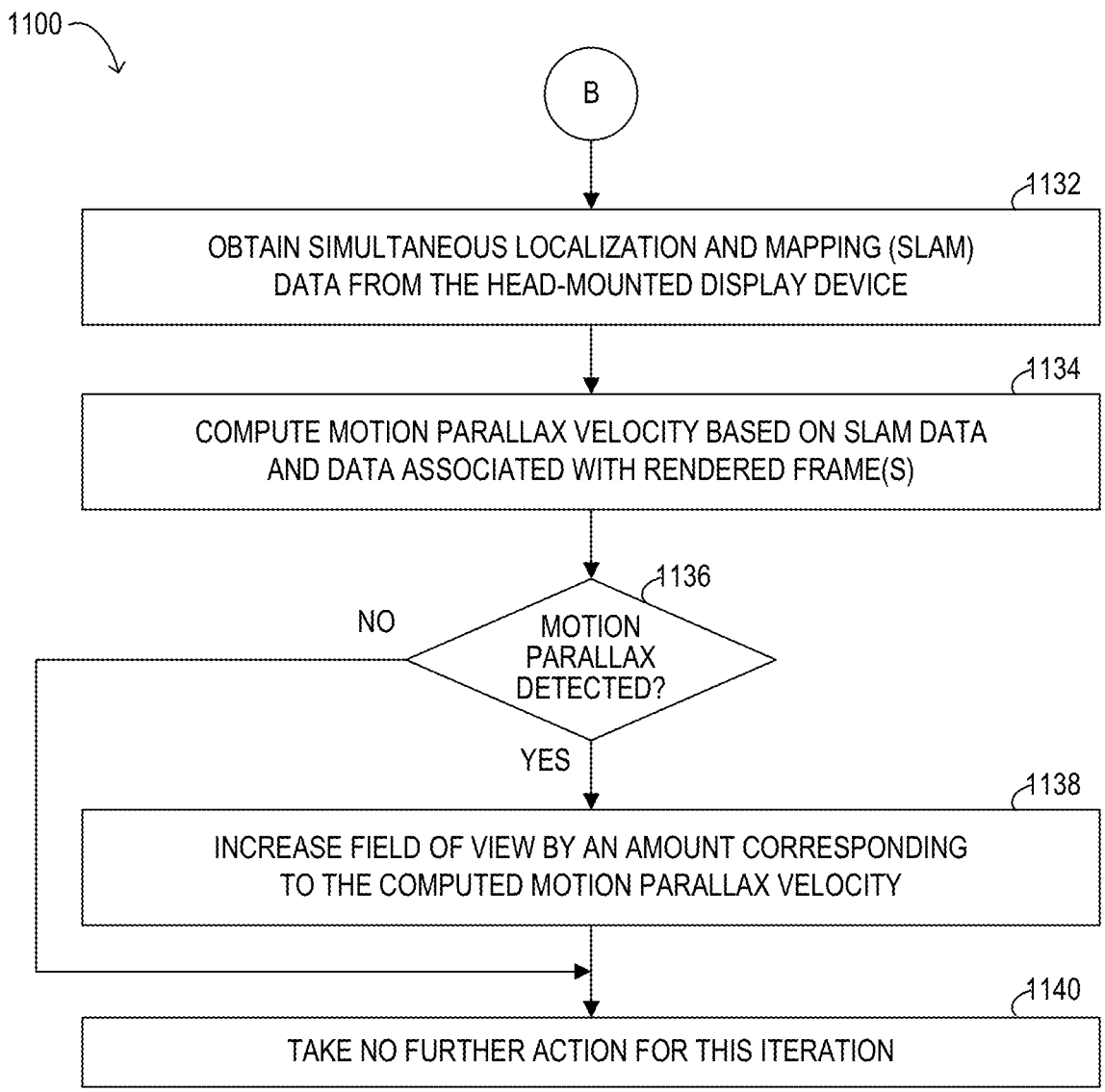

FIGS. 11A-11C illustrate a flowchart depicting selected elements of an embodiment of a method 1100 for mitigating a condition associated with motion sickness or visual fatigue in augmented and virtual reality systems that include head-mounted displays. In some embodiments, method 1100 may be performed by a motion sickness controller, such as motion sickness controller 480 of information handling system 100 illustrated in FIG. 4, motion sickness controller 660 illustrated in FIG. 6, or motion sickness controller 1060 illustrated in FIG. 10, based on data received from a head-mounted display device, such as head-mounted display device 200 illustrated in FIG. 2, head-mounted display device 300 illustrated in FIG. 3, or head-mounted display device 402 illustrated in FIG. 4. It is noted that certain operations described in method 1100 may be optional or may be rearranged in different embodiments.

Method 1100 may begin at 1102 in FIG. 11A, where for a head-mounted display device in an augmented or virtual reality system, an analysis of sensor data values received from the head-mounted display device is performed to determine whether a condition associated with motion sickness or visual fatigue currently exists. The sensor data may include inertial measurement unit data, such as a respective acceleration value for each of six degrees of freedom or axes received, for example, from inertial measurement unit 326 illustrated in FIG. 3 or inertial measurement unit 426 illustrated in FIG. 4, and/or eye gaze tracking data received, for example, from eye tracking sensors 324 illustrated in FIG. 3 or eye tracking sensors 424 illustrated in FIG. 4.

If, at 1104, a condition associated with motion sickness or visual fatigue is detected, method 1100 may continue to 1106. Otherwise, method 1100 may proceed (through connector A) to 1118 illustrated in FIG. 11B.

At 1106, the method may include obtaining data associated with rendered frame(s), including timing information for the rendered frames. At 1108, the method may include calculating, using the obtained frame timing information, the number of rendered frames per second (FPS) and applying hysteresis averaging to the data.

If, at 1110, it is determined that the hysteresis-averaged FPS is less than a target FPS by more than a predetermined threshold amount, method 1100 may continue at 1112. Otherwise, method 1100 may proceed (through connector B) to 1132 illustrated in FIG. 11C.

At 1112, method 1100 may include mapping the difference between hysteresis-averaged FPS and the target FPS to a corresponding number of steps by which to uniformly reduce the rendering resolution and the effective field of view for the head-mounted display device. In some embodiments, the number of steps may be computed as follows:

(target FPS−hysteresis-averaged FPS)/target FPS*100/20.

At 1114, the method may include reducing the rendering resolution and the effective field of view for the head-mounted device by the determined number of steps, if possible, or reducing the spatial quality of the graphics data for the head-mounted device by 1, step if not. For example, in one embodiments, if it is not possible to take the determined number of steps because the rendering resolution and/or the effective field of view have previously been reduced, a variable reduce_spatial_quality may be set to 1. Otherwise, the variable reduce_spatial_quality may be set to 0. If the variable reduce_spatial_quality is set to 1, the method may include reducing the spatial quality by one step, after which method 1100 continues to 1116. At 1116, no further action is taken for this iteration of method 1100.

Turning now to FIG. 11B, if, at 1118, it is determined that the rendering resolution is at its maximum value for the head-mounted display device, or for the context or application in which it is operating, method 1100 continues at 1120. Otherwise, method 1100 proceeds to 1126. At 1120, the method may include increasing the rendering resolution and the effective field of view for the head-mounted display by one step.

If, at 1122, it is determined that the rendering resolution and the effective field of view are in step with respect to an operation to reduce both, method 1100 continues to 1124. Otherwise, method 1100 proceeds to 1130. At 1124, the method may include increasing the rendering resolution and the effective field of view for the head-mounted display by one step, after which method 1100 proceeds to 1130.

If, at 1126, it is determined that the spatial quality value is not at its maximum value for the head-mounted display device, or for the context or application in which it is operating, method 1100 continues to 1128. Otherwise, method 1100 proceeds to 1130. At 1128, the method may include increasing the spatial quality value by one step. At 1130, no further action is taken for this iteration of method 1100.

Turning now to FIG. 11C, at 1132, method 1100 may include obtaining simultaneous localization and mapping (SLAM) data from the head-mounted display device.

At 1134, the method may include computing a motion parallax velocity based on the SLAM data and the obtained data associated with rendered frame(s).

If, at 1136, motion parallax is detected (e.g., if the motion is less than the maximum calibration motion for a given field of view), method 1100 continues to 1136. Otherwise, method 1100 proceeds to 1140. At 1138, method 1100 may include increasing the effective field of view for the head-mounted display device by an amount corresponding to the computed motion parallax velocity. In some embodiments, this may involve obtaining data representing the amount by which to increase the effective field of view from a calibration table that maps field of view values to corresponding motion parallax velocity values. At 1140, no further action is taken for this iteration of method 1100.

In some embodiments, the operations shown in FIG. 11 may be repeated at predetermined or adaptive intervals to mitigate conditions associated with motion sickness or visual fatigue. The frequency at which the operations illustrated in FIG. 11 are repeated may be dependent on the frequency at which sensor data is measured by sensors on the head-mounted display device and communicated to the information handling system. In some embodiments, the frequency at which the operations illustrated in FIG. 11 are repeated may be less than or equal to the sensor frequency. In some embodiments, the frequency at which the operations are repeated may be application-dependent, content-dependent, or user-specific.

The systems and methods described herein may use six degree of freedom sensor values received from an inertial measurement unit, software-based hysteresis averaging of the sensor values, and software service monitoring to detect conditions associated with motion sickness or visual fatigue for users wearing a head-mounted display device of an augmented or virtual reality system and to take actions to mitigate the detected conditions, resulting in improvements in the ergonomic performance of the system. The detection and mitigation of conditions associated with motion sickness or visual fatigue may be performed on a host system, such as an information handling system, without adding hardware elements to the host system or the head-mounted display device. The detection and/or mitigation processes may be performed at a configurable frequency. For example, to save power and/or compute resources, the frequency at which the detection and/or mitigation processes are performed may be lower than an operating frequency of the inertial measurement unit providing sensor data.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
an interface through which a head-mounted display is communicatively coupled to the information handling system;
a processor; and
non-transitory computer readable memory media storing instructions executable by the processor for:
receiving, during operation of the head-mounted display device from one or more inertial measurement unit sensors of the head-mounted display device, sensor data comprising data indicating respective acceleration values for the head-mounted display device with respect to each of a plurality of degrees of freedom;

determining, dependent on the sensor data, whether a condition associated with motion sickness or visual fatigue exists, the determining comprising, for sensor data indicating acceleration values for the head-mounted display device with respect to a given degree of freedom:

computing a hysteresis-based average of a plurality of the acceleration values;

computing a gradient value associated with the given degree of freedom dependent on the computed hysteresis-based average of the plurality of the acceleration values and a previously computed hysteresis-based average of acceleration values with respect to the given degree of freedom; and determining whether the computed gradient value associated with the given degree of freedom meets or exceeds a predetermined gradient threshold value for the head-mounted display device with respect to the given degree of freedom; and modifying, in response to determining that a condition associated with motion sickness or visual fatigue exists, an operating parameter for the head-mounted display device to mitigate the detected condition.

2. The information handling system of claim 1, wherein the instructions are further executable by the processor for determining the gradient threshold value through a calibration exercise associated with the head-mounted display device.

3. The information handling system of claim 1, wherein the instructions are further executable by the processor for repeating, at predetermined intervals dependent on a frequency at which the sensor data is received, determining whether a condition associated with motion sickness or visual fatigue exists.

4. The information handling system of claim 1, wherein:
the instructions are further executable by the processor for
receiving eye gaze tracking data from one or more eye tracking sensors of the head-mounted display device; and
determining whether a condition associated with motion sickness or visual fatigue exists is further dependent on the eye gaze tracking data.

5. The information handling system of claim 1, wherein:
the instructions are further executable by the processor for, in response to determining that a condition associated with motion sickness or visual fatigue does not exist:
obtaining one or more of a rendering resolution for rendering frames to be displayed on the head-mounted display device and a spatial quality setting for frames to be displayed on the head-mounted display device; and
determining whether at least one of the rendering resolution and the spatial quality setting is less than a respective predetermined maximum value for the rendering resolution or the spatial quality setting; and
modifying an operating parameter for the head-mounted display device comprises increasing the rendering resolution or the spatial quality in response to determining that at least one of the rendering resolution and the spatial quality setting is less than the respective predetermined maximum value.

6. The information handling system of claim 1, wherein:
the instructions are further executable by the processor for:
obtaining timing data associated with frames rendered for display on the head-mounted display device;
calculating, dependent on the timing data, frame rates for the head-mounted display device in terms of frames per second;
applying a hysteresis-based averaging of the frame rates; and
determining that the hysteresis-based average of the frame rates is less than a predetermined target frame rate; and
modifying an operating parameter for the head-mounted display device comprises reducing one or more of:
a rendering resolution for rendering frames to be displayed on the head-mounted display device;
an effective field of view of the head-mounted display device; and
a spatial quality setting for frames to be displayed on the head-mounted display device.

7. The information handling system of claim 1, wherein:
the instructions are further executable by the processor for:
obtaining timing data associated with frames rendered for display on the head-mounted display device;
obtaining simultaneous localization and mapping data from the head-mounted display device;
computing, based on the timing data and the simultaneous localization and mapping data, a motion parallax velocity; and
determining that the motion parallax velocity indicates motion parallax; and
modifying the operating parameter for the head-mounted display device comprises increasing an effective field of view of the head-mounted display device by an amount dependent on the motion parallax velocity.

8. A method, comprising:
receiving, during operation of a head-mounted display device from one or more inertial measurement unit sensors of the head-mounted display device, sensor data comprising data indicating respective acceleration values for the head-mounted display device with respect to each of a plurality of degrees of freedom;

determining, dependent on the sensor data, that a condition associated with motion sickness or visual fatigue exists, the determining comprising, for sensor data indicating acceleration values for the head-mounted display device with respect to a given degree of freedom:

computing a hysteresis-based average of a plurality of the acceleration values;

computing a gradient value associated with the given degree of freedom dependent on the computed hysteresis-based average of the plurality of the acceleration values and a previously computed hysteresis-based average of acceleration values with respect to the given degree of freedom; and determining that the computed gradient value associated with the given degree of freedom meets or exceeds a predetermined gradient threshold value for the head-mounted display device with respect to the given degree of freedom; and modifying, in response to determining that a condition associated with motion sickness or visual fatigue exists, an operating parameter for the head-mounted display device to mitigate the detected condition.

9. The method of claim 8, further comprising determining the gradient threshold value through a calibration exercise associated with the head-mounted display device.

10. The method of claim 8, wherein:
the method further comprises receiving eye gaze tracking data from one or more eye tracking sensors of the head-mounted display device; and
determining that a condition associated with motion sickness or visual fatigue exists is further dependent on the eye gaze tracking data.

11. The method of claim 8, wherein:
the method further comprises:
obtaining timing data associated with frames rendered for display on the head-mounted display device;
calculating, dependent on the timing data, frame rates for the head-mounted display device in terms of frames per second;
applying a hysteresis-based averaging of the frame rates; and
determining that the hysteresis-based average of the frame rates is less than a predetermined target frame rate; and
modifying an operating parameter for the head-mounted display device comprises reducing one or more of:
a rendering resolution for rendering frames to be displayed on the head-mounted display device;
an effective field of view of the head-mounted display device; and
a spatial quality setting for frames to be displayed on the head-mounted display device.

12. The method of claim 8, wherein:
the method further comprises:
obtaining timing data associated with frames rendered for display on the head-mounted display device;
obtaining simultaneous localization and mapping data from the head-mounted display device;
computing, based on the timing data and the simultaneous localization and mapping data, a motion parallax velocity; and
determining that the motion parallax velocity indicates motion parallax; and
modifying the operating parameter for the head-mounted display device comprises increasing an effective field of view of the head-mounted display device by an amount dependent on the motion parallax velocity.

13. Non-transitory computer readable memory media storing instructions executable by a processor for:
receiving, during operation of a head-mounted display device from one or more inertial measurement unit sensors of the head-mounted display device, sensor data comprising data indicating respective acceleration values for the head-mounted display device with respect to each of a plurality of degrees of freedom;
determining, dependent on the sensor data, whether a condition associated with motion sickness or visual fatigue exists, the determining comprising, for sensor data indicating acceleration values for the head-mounted display device with respect to a given degree of freedom:
computing a hysteresis-based average of a plurality of the acceleration values;
computing a gradient value associated with the given degree of freedom dependent on the computed hysteresis-based average of the plurality of the acceleration values and a previously computed hysteresis-based average of acceleration values with respect to the given degree of freedom; and
determining whether the computed gradient value associated with the given degree of freedom meets or exceeds a predetermined gradient threshold value for the head-mounted display device with respect to the given degree of freedom; and
modifying, in response to determining that a condition associated with motion sickness or visual fatigue exists, an operating parameter for the head-mounted display device to mitigate the detected condition.

14. The non-transitory computer readable memory media of claim 13, wherein:
the instructions are further executable by the processor for receiving eye gaze tracking data from one or more eye tracking sensors of the head-mounted display device; and
determining whether a condition associated with motion sickness or visual fatigue exists is further dependent on the eye gaze tracking data.

15. The non-transitory computer readable memory media of claim 13, wherein:
the instructions are further executable by the processor for, in response to determining that a condition associated with motion sickness or visual fatigue does not exist:
obtaining one or more of a rendering resolution for rendering frames to be displayed on the head-mounted display device and a spatial quality setting for frames to be displayed on the head-mounted display device; and
determining whether at least one of the rendering resolution and the spatial quality setting is less than a respective predetermined maximum value for the rendering resolution or the spatial quality setting; and
modifying an operating parameter for the head-mounted display device comprises increasing the rendering resolution or the spatial quality in response to determining that at least one of the rendering resolution and the spatial quality setting is less than the respective predetermined maximum value.

16. The non-transitory computer readable memory media of claim 13, wherein:
the instructions are further executable by the processor for:
obtaining timing data associated with frames rendered for display on the head-mounted display device;
calculating, dependent on the timing data, frame rates for the head-mounted display device in terms of frames per second;
applying a hysteresis-based averaging of the frame rates; and
determining that the hysteresis-based average of the frame rates is less than a predetermined target frame rate; and
modifying an operating parameter for the head-mounted display device comprises reducing one or more of:
a rendering resolution for rendering frames to be displayed on the head-mounted display device;
an effective field of view of the head-mounted display device; and
a spatial quality setting for frames to be displayed on the head-mounted display device.

17. The non-transitory computer readable memory media of claim 13, wherein:
the instructions are further executable by the processor for:

obtaining timing data associated with frames rendered for display on the head-mounted display device;

obtaining simultaneous localization and mapping data from the head-mounted display device;

computing, based on the timing data and the simultaneous localization and mapping data, a motion parallax velocity; and determining that the motion parallax velocity indicates motion parallax; and modifying the operating parameter for the head-mounted display device comprises increasing an effective field of view of the head-mounted display device by an amount dependent on the motion parallax velocity.

* * * * *